United States Patent
Fujii et al.

(10) Patent No.: US 10,647,230 B2
(45) Date of Patent: May 12, 2020

(54) SEAT AIR CONDITIONER

(71) Applicant: DENSO CORPORATION, Kariya, Aichi-pref. (JP)

(72) Inventors: Takahisa Fujii, Kariya (JP); Hideaki Kako, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/078,233

(22) PCT Filed: Jan. 26, 2017

(86) PCT No.: PCT/JP2017/002713
§ 371 (c)(1),
(2) Date: Aug. 21, 2018

(87) PCT Pub. No.: WO2017/145630
PCT Pub. Date: Aug. 31, 2017

(65) Prior Publication Data
US 2019/0047449 A1 Feb. 14, 2019

(30) Foreign Application Priority Data
Feb. 23, 2016 (JP) .................................. 2016-032211

(51) Int. Cl.
*A47C 7/72* (2006.01)
*B60N 2/56* (2006.01)
*B60H 1/00* (2006.01)

(52) U.S. Cl.
CPC ....... *B60N 2/5628* (2013.01); *B60H 1/00285* (2013.01); *B60N 2/565* (2013.01);
(Continued)

(58) Field of Classification Search
CPC ...... B60H 1/00285; B60H 2001/00185; B60H 2001/003; B60N 2/56; B60N 2/5657;
(Continued)

(56) References Cited

U.S. PATENT DOCUMENTS

| 6,059,018 A | 5/2000 | Yoshinori et al. |
| 9,908,447 B2 * | 3/2018 | Tanaka ..................... B60H 1/00 |

(Continued)

FOREIGN PATENT DOCUMENTS

| JP | H11028928 A | 2/1999 |
| JP | 2007126047 A | 5/2007 |

(Continued)

OTHER PUBLICATIONS

U.S. Appl. No. 16/078,162, filed Aug. 21, 2018, Fujii et al.

*Primary Examiner* — Chi Q Nguyen
(74) *Attorney, Agent, or Firm* — Harness, Dickey & Pierce, P.L.C.

(57) ABSTRACT

A seat air conditioner is applied to a seat disposed in a vehicle interior space and includes a seat back portion which supports an upper body side of a user and a seat cushion portion that supports a lower body side of the user. The seat air conditioner includes multiple air flow ducts provided in at least one of the seat back portion or the seat cushion portion and define an air flow passage for air to be blown out from the seat or air to be drawn into the seat. Some of the multiple air flow ducts are configured to be independent from the other air flow ducts such that air, which is different in temperature from the air flowing through the other air flow ducts, is allowed to flow through the some air flow ducts.

13 Claims, 18 Drawing Sheets

(52) U.S. Cl.
CPC ...... *B60N 2/5657* (2013.01); *B60H 2001/003* (2013.01); *B60H 2001/00185* (2013.01)

(58) Field of Classification Search
CPC ......... B60N 2/5628; A47C 7/74; A47C 7/742; A47C 7/744
USPC .... 297/180.1, 180.13, 180.14, 180.12, 217.3
See application file for complete search history.

(56) References Cited

U.S. PATENT DOCUMENTS

| | | | |
|---|---|---|---|
| 2004/0164594 A1* | 8/2004 | Stoewe | B60N 2/5635 297/180.14 |
| 2005/0280294 A1 | 12/2005 | Ishima et al. | |
| 2007/0069554 A1* | 3/2007 | Comiskey | B60N 2/5635 297/180.12 |
| 2007/0095378 A1* | 5/2007 | Ito | B60N 2/5657 136/203 |
| 2007/0101729 A1 | 5/2007 | Aoki et al. | |
| 2009/0031742 A1* | 2/2009 | Seo | B60N 2/5628 62/244 |
| 2009/0218855 A1* | 9/2009 | Wolas | A47C 7/74 297/180.14 |
| 2011/0186560 A1* | 8/2011 | Kennedy | B60N 2/5628 219/217 |
| 2012/0013153 A1* | 1/2012 | Chang | B60N 2/5635 297/180.1 |
| 2015/0217665 A1 | 8/2015 | Hickey et al. | |
| 2015/0266404 A1* | 9/2015 | Sakane | B60H 1/241 454/152 |
| 2015/0274049 A1* | 10/2015 | Langensiepen | B60N 2/5628 297/180.12 |
| 2015/0329028 A1* | 11/2015 | Ogino | B60N 2/5635 297/180.14 |

FOREIGN PATENT DOCUMENTS

| | | |
|---|---|---|
| JP | 2007215695 A | 8/2007 |
| JP | 2009125536 A | 6/2009 |
| JP | 2016000605 A | 1/2016 |
| WO | WO-20050096891 A1 | 10/2005 |
| WO | WO-2017145631 A1 | 8/2017 |

* cited by examiner

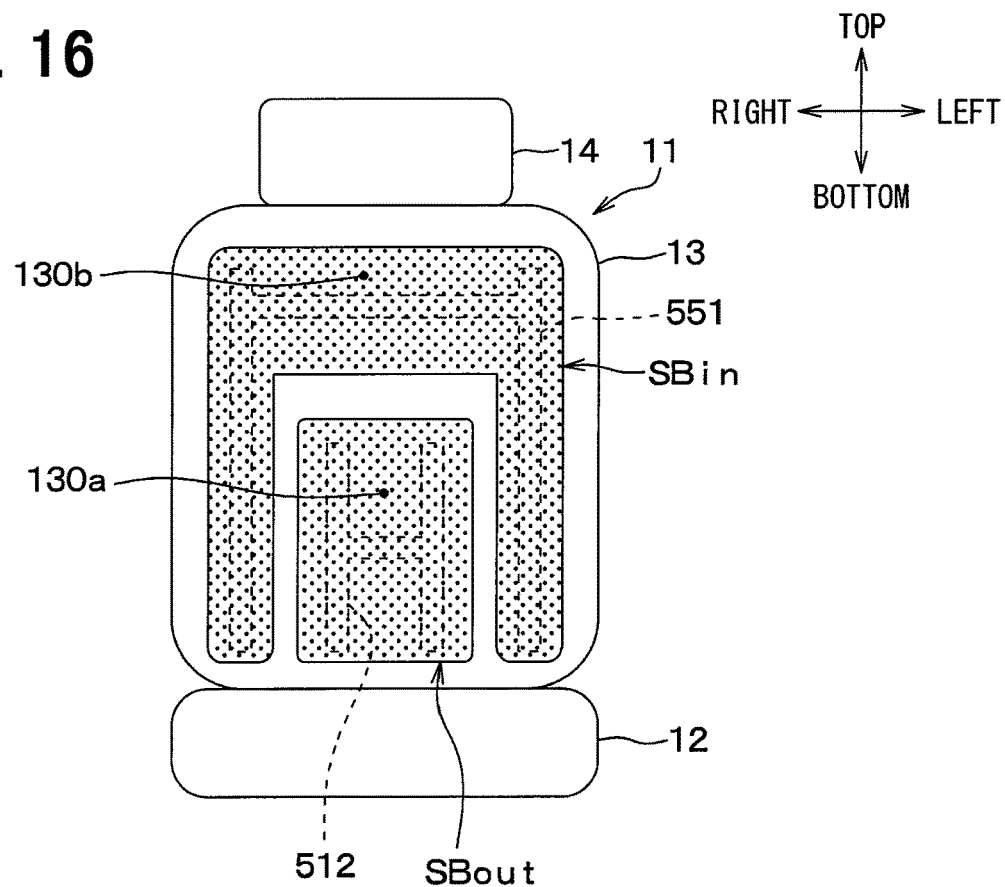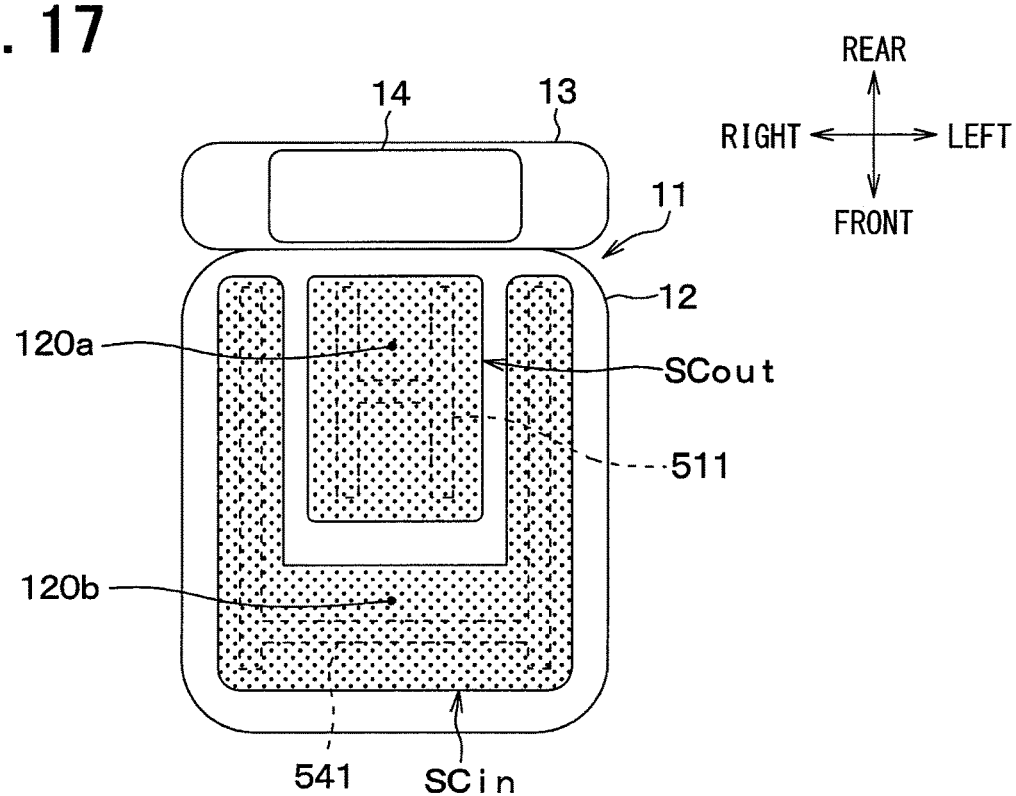

SEAT AIR CONDITIONER

CROSS-REFERENCE TO RELATED APPLICATIONS

This application is a U.S. National Phase Application under 35 U.S.C. 371 of International Application No. PCT/JP2017/002713 filed on Jan. 26, 2017 and published in Japanese as WO/2017/145630 A1 on Aug. 31, 2017. This application is based on and claims the benefit of priority from Japanese Patent Application No. 2016-032211 filed on Feb. 23, 2016. The entire disclosures of all of the above applications are incorporated herein by reference.

TECHNICAL FIELD

The present disclosure relates to a seat air conditioner.

BACKGROUND ART

Up to now, an air conditioning function of a seat has been required to quickly cool down or to quickly warm up and a uniform thermal sensation without temperature bias. In response to such a requirement, an air conditioning seat has been proposed which can switch between a blowing mode for blowing out the air from a seating surface of the seat and a suction mode for drawing the air from the seating surface of the seat (for example, refer to Patent Literature 1).

PRIOR ART LITERATURES

Patent Literature

Patent Literature 1: JP 2009-125536 A

SUMMARY OF INVENTION

The present inventors have investigated functions of the seat air conditioner required by the user. As a result of the investigation, in recent years, the present inventors have found that the seat air conditioner tends to be required to have different functions such as drowsiness, partial temperature adjustment and the like.

In view of such a tendency, the present inventors have examined a response to the above-mentioned user's requirement by imparting different thermal sensations to at least one of an upper body side or a lower body side of the user.

However, since a structure of the conventional seat air conditioner is designed on the premise of imparting a uniform thermal sensation to the user, it is difficult to impart different thermal sensations to the user.

The present disclosure aims to provide a seat air conditioner capable of imparting different thermal sensations to a user.

According to a first aspect of the present disclosure, a seat air conditioner is applied to a seat disposed in a vehicle interior space, the seat including a seat back portion which supports an upper body side of a user and a seat cushion portion which supports a lower body side of the user.

The seat air conditioner includes a plurality of air flow ducts provided in at least one of the seat back portion or the seat cushion portion, the plurality of air flow ducts defining an air flow passage for air to be blown out from the seat or air to be drawn into the seat.

Further, one air flow duct of the plurality of air flow ducts is configured to be independent from the other air flow ducts other than the one air flow duct, such that air, which is different in temperature from air flowing through the other air flow ducts, is allowed to flow through the one air flow duct.

As described above, since at least one of the seat back portion or the seat cushion portion is provided with the multiple air flow ducts, air at different air volumes, temperatures, or the like can be blown at the same time, and air blowing and air drawing can be performed at the same time. Since a portion of the multiple air flow ducts is configured to be independent from the other air flow ducts, air at different temperatures, air volumes, and the like is allowed to flow through the multiple air flow ducts, thereby being capable of imparting different thermal sensations to the user.

According to another aspect of the present disclosure, in the seat air conditioner, the multiple air flow ducts are configured to be independent of each other so that the air flowing inside the air flow ducts is not mixed with each other.

According to the above configuration, since the air flowing inside the multiple air flow ducts is not mixed with each other, air at different temperatures, air volume, and the like is allowed to flow through the multiple air flow ducts, thereby being capable of imparting different thermal sensations to the user.

BRIEF DESCRIPTION OF DRAWINGS

FIG. 16 is a front view of a seat showing a front side of a seat back portion according to a fifth embodiment.

FIG. 17 is a top view of a seat showing a front side of a seat cushion portion according to the fifth embodiment.

DESCRIPTION OF EMBODIMENTS

Figure 1:
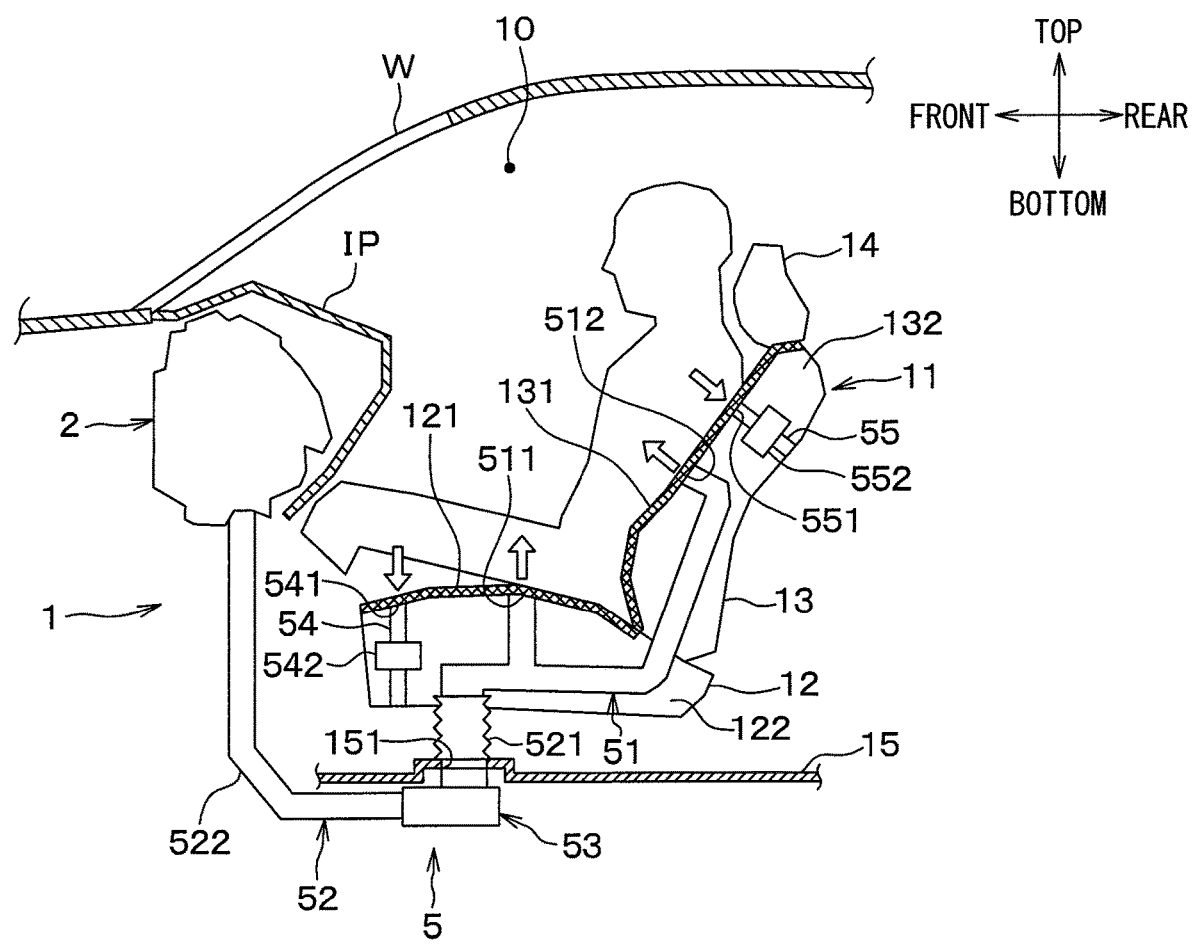
FIG. 1 is a schematic configuration diagram of an air conditioning device for a vehicle including a seat air conditioner according to a first embodiment.

Hereinafter, embodiments of the present disclosure will be described with reference to the drawings. In each of the following embodiments, parts that are the same as or equivalent to those described in the preceding embodiment are denoted by the same reference numerals, and a description of the same parts may be omitted. Also, in each of the embodiments, when only a part of the components is described, the components described in the preceding embodiments can be applied to the other parts of the components. The following embodiments can partially combine the embodiments with each other even in a case where the combination does not cause hindrance, even if not expressly stated.

(First Embodiment)

The present embodiment will be described with reference to FIGS. 1 to 7. An air conditioning device for a vehicle 1 shown in FIG. 1 includes an interior air conditioning unit 2 which is an air conditioning unit for air conditioning a vehicle interior space 10, and a seat air conditioner 5 applied to a seat 11 disposed in the vehicle interior space 10. It should be noted that arrows indicating up, down, left, right and front and rear shown in the drawings indicate an up-down direction, a right-left direction, and a front-rear direction when mounted on the vehicle.

First, the interior air conditioning unit 2 will be described with reference to FIGS. 1 and 2. As shown in FIG. 1, the interior air conditioning unit 2 is disposed inside an instrument panel IP at a foremost portion of the vehicle interior space 10.

Figure 2:
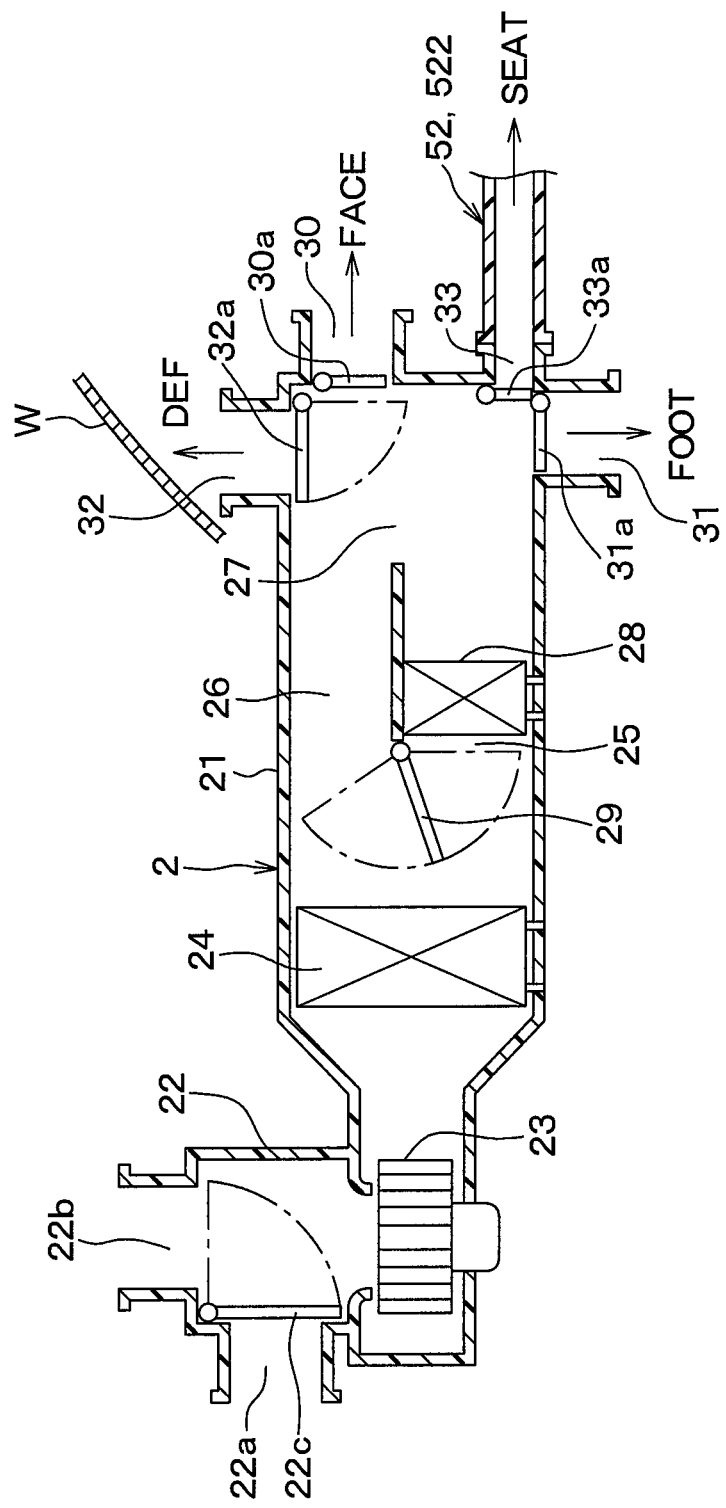
FIG. 2 is a schematic configuration diagram of an interior air conditioning unit shown in FIG. 1.

In the interior air conditioning unit 2, as shown in FIG. 2, an air conditioning blower 23, an evaporator 24, a heater core 28, and the like are accommodated inside an air conditioning case 21 which is an outer shell of the interior air conditioning unit 2. An inside-outside air switching box 22 for switchably introducing a vehicle interior air (hereinafter referred to as inside air) and a vehicle exterior air (hereinafter referred to as outside air) is disposed at a most upstream side of the air conditioning case 21 along an air flow.

The inside-outside air switching box 22 has an inside air introduction port 22a for introducing the inside air into the air conditioning case 21 and an outside air introduction port 22b for introducing the outside air into the air conditioning case 21. An inside-outside air switch door 22c for adjusting opening areas of the inside air introduction port 22a and the outside air introduction port 22b is disposed in the inside-outside air switching box 22. The operation of the inside-outside air switch door 22c is controlled according to a control signal output from a control device 100 to be described later.

An air conditioning blower 23 is disposed on an air flow downstream side of the inside-outside air switching box 22. The air conditioning blower 23 is configured to blow the air drawn through the inside-outside air switching box 22 toward the vehicle interior space 10. The air conditioning blower 23 is an electric blower capable of changing a rotational speed according to the control signal from the control device 100 to be described later. A centrifugal fan, an axial flow fan, a cross flow fan, or the like can be adopted as a fan of the air conditioning blower 23.

The evaporator 24 is disposed on the air flow downstream side of the air conditioning blower 23. The evaporator 24 is a cooling heat exchanger that exchanges heat between a refrigerant flowing inside and an air blown from the air conditioning blower 23 to cool the blown air. The evaporator 24 according to the present embodiment forms a vapor compression type refrigeration cycle together with a compressor, a condenser, an expansion valve not shown, and the like.

A hot air passage 25, a cold air bypass passage 26, and a mixing space 27 are provided on the air flow downstream side of the evaporator 24 in the air conditioning case 21. The air having passed through the evaporator 24 flows through the hot air passage 25 and the cold air bypass passage 26. The air having flowed out of the hot air passage 25 and the cold air bypass passage 26 is mixed together in the mixing space 27.

The heater core 28 for heating the air that has passed through the evaporator 24 is disposed in the hot air passage 25. The heater core 28 is a heating heat exchanger that exchanges heat between a coolant water for cooling an engine not shown and the blown air that has passed through the evaporator 24 to heat the blown air. In the present embodiment, the evaporator 24 and the heater core 28 form a temperature adjustment device installed in the interior air conditioning unit 2.

The cold air bypass passage 26 is an air passage for leading the air having passed through the evaporator 24 to the mixing space 27 without passing through the heater core 28. Therefore, a temperature of the blown air mixed in the mixing space 27 changes according to an air volume ratio of the air passing through the hot air passage 25 and the air passing through the cold air bypass passage 26.

Therefore, in the present embodiment, an air mixing door 29 is disposed on the air flow downstream side of the evaporator 24 and on an inlet side of the hot air passage 25 and the cold air bypass passage 26. The air mixing door 29 changes the air volume ratio of the cold airs flowing into the hot air passage 25 and the cold air bypass passage 26. The air mixing door 29 functions as a temperature adjustment member for adjusting the air temperature in the mixing space 27. The operation of the air mixing door 29 is controlled according to the control signal output from the control device 100 to be described later.

Further, first to fourth air conditioning opening portions 30 to 33 are provided in an air flow most downstream portion of the air conditioning case 21. The first to fourth air conditioning opening portions 30 to 33 blow out the blown air whose temperature has been adjusted in the mixing space 27. The first air conditioning opening portion 30 is an opening portion through which air is blown toward the upper body of the occupant in the vehicle interior space 10. The second air conditioning opening portion 31 is an opening portion through which air is blown toward feet of the occupant. The third air conditioning opening portion 32 is an opening portion through which air is blown toward an inside of a window glass W on a front side of the vehicle. The fourth air conditioning opening portion 33 is an opening portion through which air is supplied to the seat air conditioner 5. Incidentally, a main duct member 52 of the seat air conditioner 5 to be described later is connected to the fourth air conditioning opening portion 33.

First to fourth mode doors 30a to 33a are disposed on the air flow upstream side of the first to fourth air conditioning opening portions 30 to 33. The first to fourth mode doors 30a to 33a adjust the respective opening areas. The first to fourth mode doors 30a to 33a form a blowing port mode switching unit that switches the blowing port mode to another. The operation of the first to fourth mode doors 30a to 33a is controlled according to the control signal output from the control device 100 to be described later.

Next, the seat air conditioner 5 will be described. The seat air conditioner 5 according to the present embodiment is configured so as to set a suction mode for drawing air from a front side of the seat 11 and a blowing mode for blowing air adjusted in temperature by the interior air conditioning unit 2 from the front side of the seat 11. In the present embodiment, the interior air conditioning unit 2 is a temperature adjustment unit for adjusting the temperature of the air blown out from the seat 11 to a temperature different from that of the inside air.

As shown in FIG. 1, the seat air conditioner 5 is provided on the seat 11 disposed on a front side of the vehicle interior space 10. The seat 11 provided with the seat air conditioner 5 includes a seat cushion portion 12 for supporting a lower body of the occupant, a seat back portion 13 for supporting an upper body of the occupant, and a headrest portion 14 for supporting a head of the occupant.

The seat cushion portion 12 is a member for supporting buttocks and thighs of a user (that is, occupant). The seat cushion portion 12 includes a skin member 121 that covers a front side that forms a contact surface of the user on the seat 11, and a pad member 122 that is covered with the skin member 121.

The seat back portion 13 is a member that mainly supports a waist and a back of the user. As with the seat cushion portion 12, the seat back portion 13 includes a skin member 131 that covers a front side which forms a contact surface of the user on the seat 11, and a pad member 132 that is covered with the skin member 131.

Although not shown, each of the skin members 121 and 131 of the seat cushion portion 12 and the seat back portion 13 are formed by a skin contacting the user and a cushion portion disposed on a back side of the skin. The skin is made of a member having an air permeability such as a woven fabric, a mesh sheet, or the like. Further, the cushion portion is made of a member having air permeability such as cotton or synthetic resin sponge.

The pad members 122 and 132 of the seat cushion portion 12 and the seat back portion 13 are disposed on the back side of the skin members 121 and 131. The pad members 122 and 132 are members that exert a cushioning action, and have sufficiently large thicknesses as compared with the skin members 121 and 131. Unlike the skin members 121 and 131, the pad members 122 and 132 are made of a material having no air permeability (for example, foam material such as urethane foam). Although not shown, a metal frame forming a skeleton is installed inside each of the seat cushion portion 12 and the seat back portion 13.

A main blowing duct 51 is disposed in each of the seat cushion portion 12 and the seat back portion 13. The main blowing duct 51 forms an air flow passage for the air blown from the front side of the seat 11 as a component of the seat air conditioner 5. The main blowing duct 51 is disposed across both of the seat cushion portion 12 and the seat back portion 13.

The main blowing duct 51 is provided with a first blowing opening portion 511 and a second blowing opening portion 512 as opening portions that open to the skin members 121 and 131 of the seat cushion portion 12 and the seat back portion 13, respectively.

The main blowing duct 51 according to the present embodiment is branched inside the seat 11 such that the air is blown out from both of the first blowing opening portion 511 provided in the seat cushion portion 12 and the second blowing opening portion 512 provided in the seat back portion 13. In the present embodiment, the first blowing opening portion 511 and the second blowing opening portion 512 form a blowing portion that communicates with the main blowing duct 51 on the front side of the seat 11.

The main blowing duct 51 is connected to the interior air conditioning unit 2 through the main duct member 52 so that the air whose temperature has been adjusted by the interior air conditioning unit 2 flows through the main blowing duct 51. Specifically, the other end side of the main blowing duct 51 is connected to the fourth air conditioning opening portion 33 of the interior air conditioning unit 2 through the main duct member 52.

In this example, the main duct member 52 includes a seat connection portion 521 and an air conditioning connection portion 522. One end side of the seat connection portion 521 is connected to an end of the main blowing duct 51 on a back side of the seat 11 and the other end side of the seat connection portion 521 is connected to a through hole 151 provided in a floor surface 15 of the vehicle. The seat connection portion 521 is formed of a bellows-shaped duct so as to cope with a movement of the seat 11 in a vertical direction and a longitudinal direction. Incidentally, a duct other than the bellows-shaped duct may be adopted as the seat connection portion 521 as long as the duct has flexibility.

One end side of the air conditioning connection portion 522 is connected to the through hole 151 of the floor surface 15 and the other end side of the air conditioning connection portion 522 is connected to the fourth air conditioning opening portion 33 of the interior air conditioning unit 2. The air conditioning connection portion 522 is disposed below the floor surface 15 and inside the instrument panel IP so as not to affect a design property of the vehicle interior space 10.

The air conditioning connection portion 522 is provided with a first auxiliary blower 53 for assisting air blowing from the interior air conditioning unit 2 side to the main blowing duct 51 side. The first auxiliary blower 53 is an electric blower capable of changing a rotational speed according to the control signal from the control device 100 to be described later. A centrifugal fan, an axial flow fan, a cross flow fan, or the like can be adopted as a fan of the first auxiliary blower 53.

In this example, in the configuration in which the air whose temperature has been adjusted by the interior air conditioning unit 2 is blown out from the front side of the seat 11 through the main blowing duct 51, the air of a uniform temperature is blown out over an entire surface of the seat 11. The configuration described above makes it impossible to impart different thermal sensations to the user by simultaneously blowing the air of different temperatures from the respective portions of the seat 11.

From the viewpoint of imparting different thermal sensations to the user, it is conceivable to blow out the air from the front side of the seat 11 and to draw the air from the front side of the seat 11 with the use of a single air flow duct.

However, in the configuration in which the air is blown out and the air is drawn with the use of the single air flow duct, air blowing and air drawing cannot be performed at the same time, and the different thermal sensations cannot be imparted to the user at the same time.

Therefore, in order to impart different thermal sensations to the lower body side of the user, in the seat air conditioner 5 according to the present embodiment, a first suction duct 54 is disposed for the seat cushion portion 12 aside from the main blowing duct 51. The first suction duct 54 defines an air flow passage of the air drawn from the front side of the seat 11.

In addition, in order to impart different thermal sensations to the upper body side of the user, in the seat air conditioner 5 according to the present embodiment, a second suction duct 55 is disposed for the seat back portion 13 aside from the main blowing duct 51. The second suction duct 55 defines an air flow passage of the air drawn from the front side of the seat 11.

The first suction duct 54 is provided with a first suction opening portion 541 as an opening portion that opens to the skin member 121 side of the seat cushion portion 12. In the present embodiment, the first suction opening portion 541 is a suction portion that communicates with the first suction duct 54 on the front side of the seat cushion portion 12.

A first suction blower 542 is disposed in the first suction duct 54. The first suction blower 542 draws the air from the front side of the seat cushion portion 12 through the first suction opening portion 541. The first suction blower 542 is an electric blower capable of changing a rotational speed according to the control signal from the control device 100 to be described later. A centrifugal fan, an axial flow fan, a cross flow fan, or the like can be adopted as a fan of the first suction blower 542.

The first suction duct 54 according to the present embodiment opens to the back side, that is, a bottom side of the seat cushion portion 12. As a result, the air drawn from the front side of the seat cushion portion 12 by the first suction blower 542 is discharged to the back side of the seat cushion portion 12.

The second suction duct 55 is provided with a second suction opening portion 551 as an opening portion that opens to the skin member 131 side of the seat back portion 13. In the present embodiment, the second suction opening portion 551 forms a suction portion that communicates with the second suction duct 55 on the front side of the seat back portion 13.

A second suction blower 552 is disposed in the second suction duct 55. The second suction blower 552 draws the air from the front side of the seat back portion 13 through the second suction opening portion 551. The second suction blower 552 is an electric blower capable of changing a rotational speed according to the control signal from the control device 100 to be described later. A centrifugal fan, an axial flow fan, a cross flow fan, or the like can be adopted as a fan of the second suction blower 552.

The second suction duct 55 according to the present embodiment opens to the back side, that is, a rear side of the seat back portion 13. As a result, the air drawn from the front side of the seat back portion 13 by the second suction blower 552 is discharged to the back side of the seat back portion 13.

The main blowing duct 51 according to the present embodiment is configured to be independent from the first suction duct 54 and the second suction duct 55 such that the air at different a temperature from the air flowing through the first suction duct 54 and the second suction duct 55 can flow through the main blowing duct 51. In the present embodiment, the main blowing duct 51 is an air flow duct independent from the other air flow ducts other than the main blowing duct 51.

Specifically, the main blowing duct 51, the first suction duct 54, and the second suction duct 55 according to the present embodiment are configured to be independent from each other so that the air flowing through the main duct 51, the first suction duct 54, and the second suction duct 55 is not mixed with each other. In other words, the main blowing duct 51, the first suction duct 54, and the second suction duct 55 are configured so as not to communicate with each other inside the seat 11.

In the present embodiment, the main blowing duct 51 and the first suction duct 54 form two independent air flow passages in the seat cushion portion 12. Further, in the present embodiment, the main blowing duct 51 and the second suction duct 55 form two air flow passages independent from each other in the seat back portion 13. In the present embodiment, the main blowing duct 51 and the first suction duct 54 form multiple air flow ducts provided inside the seat cushion portion 12. Further, in the present embodiment, the main blowing duct 51 and the second air suction duct 55 form multiple air flow ducts provided inside the seat back portion 13.

Figure 3:
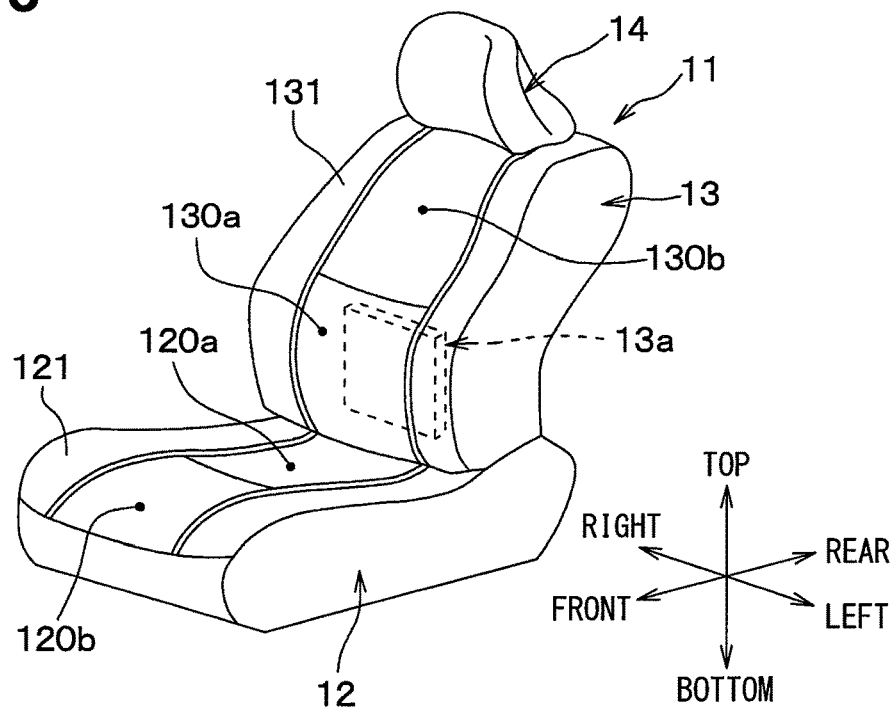
FIG. 3 is a schematic perspective view of a seat according to the first embodiment.

In this example, in a state where the user is seated on the seat 11, the seat back portion 13 supports the user's waist at the lower side portion and supports the user's back at the upper side portion. As shown in FIG. 3, the seat back portion 13 according to the present embodiment includes a waist support portion 130a that supports the waist below a center portion in the vertical direction, and a back support portion 130b that supports the back portion above the center portion in the vertical direction. Specifically, the waist support portion 130a is a portion where a plate-shape lumbar plate 13a is disposed inside the seat 11. The back support portion 130b is a portion between the lumbar plate 13a and the headrest portion 14. In one type of the seat 11, the lumbar plate 13a supports the waist and the back portion, and a boundary between the waist support portion 130a and the back support portion 130b may become unnoticeable. For that reason, the waist support portion 130a can also be defined as a portion of the seat back portion 13 below the center portion in the vertical direction. Further, the back support portion 130b can be defined as a portion of the seat back portion 13 above the center portion in the vertical direction.

In the seat back portion 13, a pressure of the user's body tends to be more easily concentrated on the lower portion supporting the waist than the upper portion supporting the back portion. In other words, in the seat back portion 13, a pressure acting on the waist support portion 130a tends to be easily higher than a pressure acting on the back support portion 130b. In the present embodiment, the waist support portion 130a forms a high seat pressure portion in the seat back portion 13.

Since the lower portion of the seat back portion 13 is higher in the degree of close contact with the user than the upper portion, when the air is blown from the front side of the seat 11, a pressure loss of the air is large, which makes it difficult to secure a sufficient blowing air volume. For that reason, in the lower portion of the seat back portion 13, there is a need to supply the air having a temperature difference from the inside air in order to secure a thermal sensation to be provided to the user, as compared with a portion around the seat back portion 13.

Figure 4:
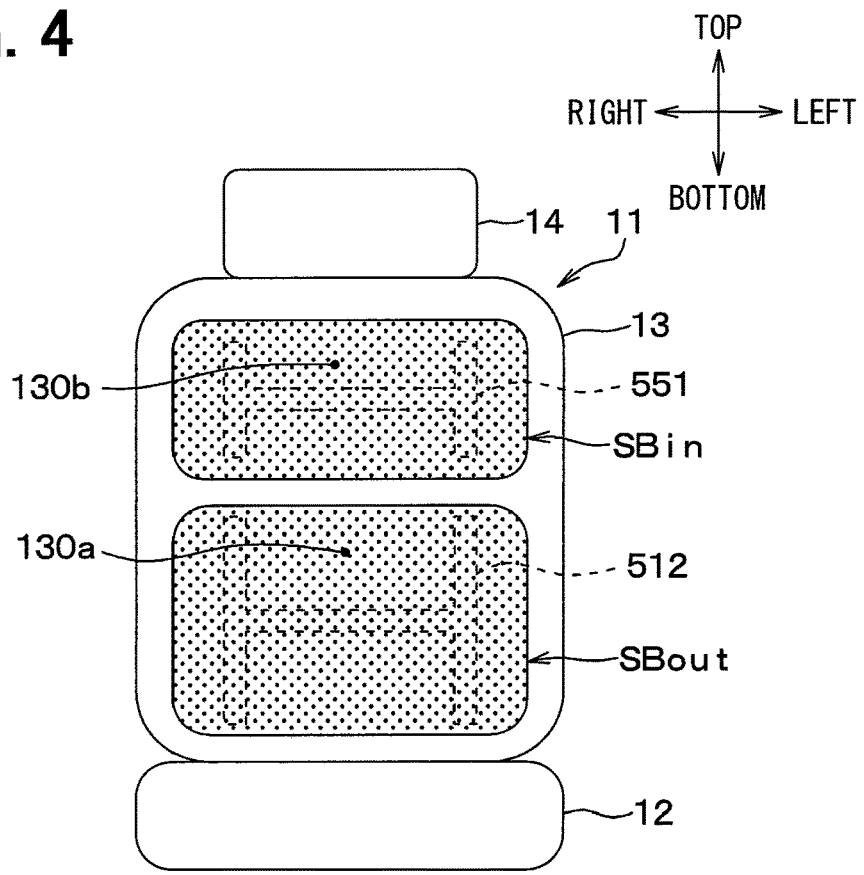
FIG. 4 is a front view of a seat showing a front side of a seat back portion according to the first embodiment.

Therefore, according to the present embodiment, the second blowing opening portion 512 and the second suction opening portion 551 provided in the seat back portion 13 are divided into up and down. In other words, according to the present embodiment, as shown in FIG. 4, in the seat back portion 13, the second suction opening portion 551 is set above the second blowing opening portion 512. As a result, in the seat back portion 13 of the present embodiment, a suction region SBin for drawing the air and a blowing region SBout for blowing the air are formed at different positions.

Specifically, in the seat back portion 13 of the present embodiment, the second blowing opening portion 512 is set in the waist support portion 130a which is a high seat pressure portion, and the second suction opening portion 551 is set in the back support portion 130b which is a portion other than the high seat pressure portion.

On the other hand, the seat cushion portion 12 supports the buttocks of the user at the rear portion and supports the user's thigh portion at the front portion in a state where the user is seated on the seat 11. As shown in FIG. 3, the seat cushion portion 12 according to the present embodiment includes a buttocks support portion 120a that supports the buttocks at the rear of the center portion in the longitudinal direction and a thigh support portion 120b that supports the thigh in front of the center portion in the longitudinal direction. In the seat cushion portion 12 according to the present embodiment, a portion at the rear of the center portion in the longitudinal direction forms the buttocks support portion 120a, and a portion in front of the center portion in the longitudinal direction forms the thigh support portion 120b.

In the seat cushion portion 12, a pressure of the user's body tends to be more easily concentrated on the rear portion supporting the buttocks than the front portion supporting the thigh. In other words, in the seat cushion portion 12, a pressure acting on the buttocks support portion 120a tends to be easily higher than a pressure acting on the thigh support portion 120b. In the present embodiment, the buttocks support portion 120a forms a high seat pressure portion in the seat cushion portion 12.

Since the rear portion of the seat cushion portion 12 is higher in the degree of close contact with the user than the front portion, when the air is blown from the front side of the seat 11, a pressure loss of the air is large, which makes it difficult to secure a sufficient blowing air volume. For that reason, in the rear portion of the seat cushion portion 12, there is a need to supply the air having a temperature difference from the inside air in order to secure a thermal sensation to be provided to the user, as compared with a portion around the seat back portion 13.

Figure 5:
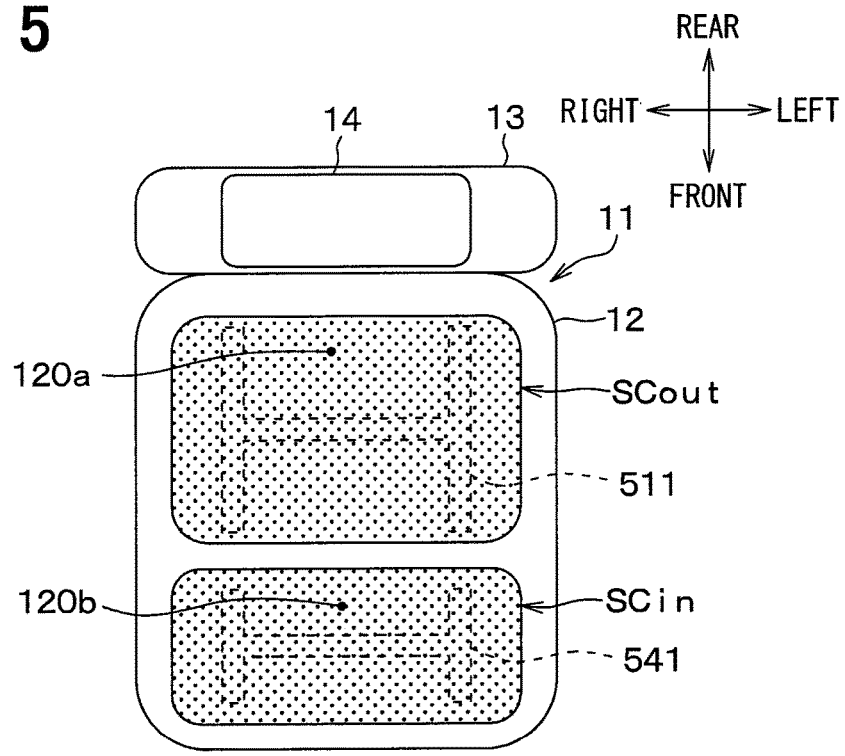
FIG. 5 is a top view of a seat showing a front side of a seat cushion portion according to the first embodiment.

Therefore, according to the present embodiment, the first blowing opening portion 511 and the first suction opening portion 541 provided in the seat cushion portion 12 are divided into front and back. In other words, according to the present embodiment, as shown in FIG. 5, in the seat cushion portion 12, the first suction opening portion 541 is set in front of the first blowing opening portion 511. As a result, in the seat cushion portion 12 of the present embodiment, a suction region SCin for drawing the air and a blowing region SCout for blowing the air are formed at different positions.

Specifically, in the seat cushion portion 11 according to the present embodiment, the first blowing opening portion 511 is set in the buttocks support portion 120a which is a high seat pressure portion, and the first suction opening portion 541 is set in the thigh support portion 120b which is a portion other than the high seat pressure portion.

Figure 6:
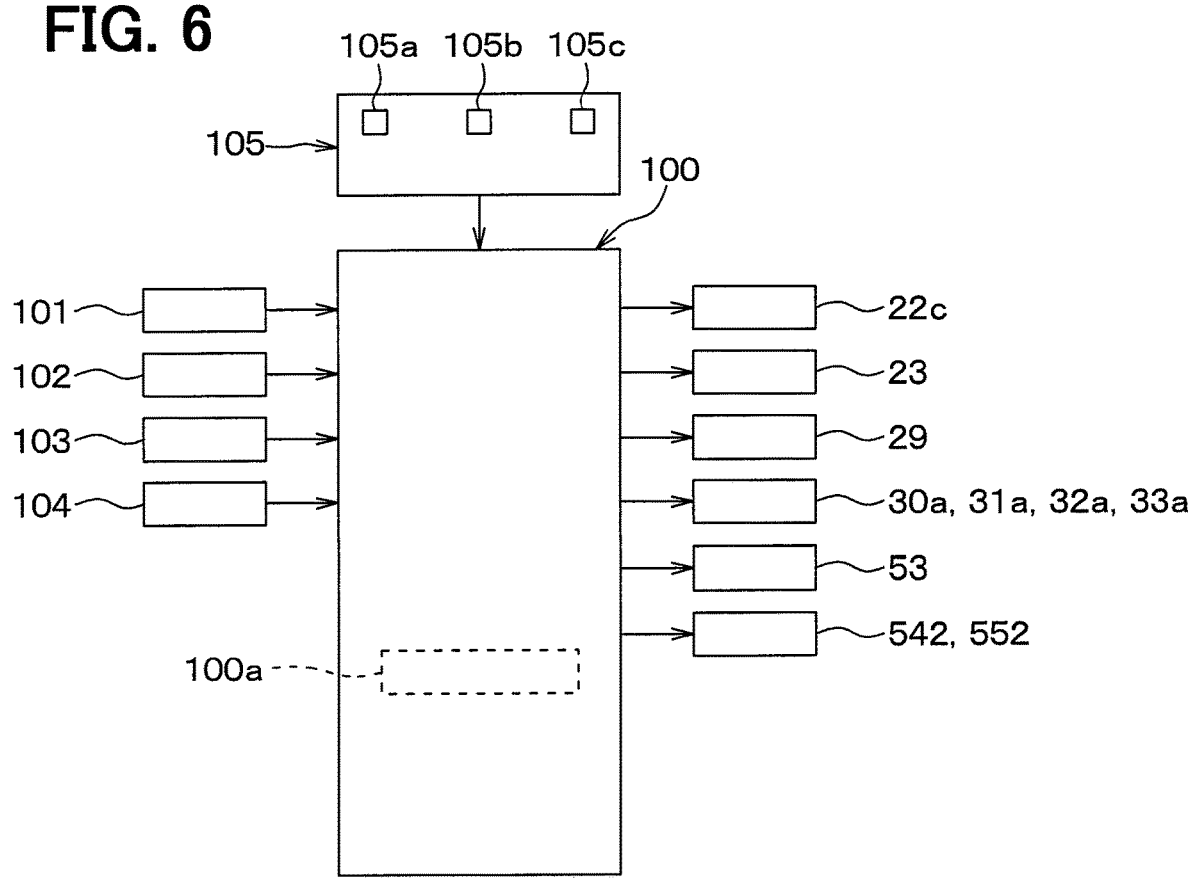
FIG. 6 is a block diagram of a control device according to the first embodiment.

Next, the electric control device 100 as an electric control unit according to the present embodiment will be described with reference to FIG. 6. The control device 100 includes a microcomputer including a CPU and a storage unit such a ROM and a RAM, and a peripheral circuit of the microcomputer. The control device 100 performs various calculations and processes based on control programs stored in the storage unit, and controls the operation of various devices connected to an output side of the control device 100. The storage unit of the control device 100 is a non-transitory tangible storage medium.

The control device 100 is a device that controls the operation of the interior air conditioning unit 2 and the seat air conditioner 5. In the present embodiment, the control device 100 is a temperature adjustment control unit that controls the interior air conditioning unit 2 which is a temperature adjustment unit.

An output side of the control device 100 is connected with the inside-outside air switch door 22c, the air conditioning blower 23, the air mixing door 29, the first to fourth mode doors 30a to 33a, and so on, which are components of the interior air conditioning unit 2. In addition, the output side of the control device 100 is connected with the first auxiliary blower 53, the first suction blower 542, the second suction blower 552, and the like which are components of the seat air conditioner 5.

An input side of the control device 100 is connected with a group of various sensor groups such as an inside air sensor 101, an outside air sensor 102, and a insolation sensor 103. The inside air sensor 101 detects an inside air temperature Tr, the outside air sensor 102 detects an outside air temperature Tam, the insolation sensor 103 detects an amount of insolation Ts to the vehicle interior space 10.

Further, the input side of the control device 100 is connected with a reduced wakefulness detection unit 104 that detects a reduced wakefulness state in which the wakefulness level of the user has decreased due to drowsiness or the like. In the present embodiment, as the reduced wakefulness detection unit 104, a device that detects a decrease in the wakefulness level of the user based on a heart rate of the user is adopted.

In this example, the heart rate of the user tends to decrease as the wakefulness level of the user decreases. For that reason, when the heart rate of the user decreases below a predetermined value, the reduced wakefulness detection unit 104 outputs a signal indicating the reduced wakefulness state to the control device 100.

The present disclosure is not limited to the reduced wakefulness detection unit 104 based on the heart rate of the user, but a visual motion detection device that detects a decrease in the wakefulness level of the user based on the number of blinks of the user may be adopted.

In this example, the number of blinks of the user tends to decrease as the wakefulness level of the user decreases. For that reason, the visual motion detection device may be configured to output a signal indicating the reduced wakefulness state to the control device 100 when the number of blinks of the user decreases below a predetermined number. If the wakefulness level of the user decreases, a speed of blinking of the user tends to decrease and a viewpoint of the user tends to fall below usual. For that reason, the visual motion detection device may be configured to output a signal indicating the reduced wakefulness state to the control device 100 when a blinking speed drops below a predetermined value or when the viewpoint is lowered below a reference position.

Further, the input side of the control device 100 is connected with an operation panel 105 that is disposed in the vicinity of the instrument panel IP is connected. An air conditioning operation switch 105a, a vehicle interior temperature setting switch 105b, a seat operation switch 105c of the seat air conditioner 5, and the like are provided as various operation switches on the operation panel 105.

The air conditioning operation switch 105a is a switch that outputs a request signal to the control device 100. The request signal is provided for controlling the temperature of the air blown into the vehicle interior space 10 by the interior air conditioning unit 2 by operating the air conditioning blower 23.

The seat operation switch 105c is a switch that outputs to the control device 100 a request signal for blowing out the air from the front side of the seat 11 or drawing the air from the front side of the seat 11.

In this example, the control device 100 according to the present embodiment integrally includes a control unit that controls various devices as control targets which are connected to the output side of the control device 100. The control device 100 functions as a control unit that controls the operation of each component by hardware or software which controls the operation of each component as a control target.

For example, the control device 100 according to the present embodiment executes a mode switching process for switching from a normal seat air conditioning mode to a wakeful seat air conditioning mode when the reduced wakefulness state is detected by the reduced wakefulness detection unit 104. In the present embodiment, the hardware and software for executing the mode switching process in the control device 100 forms the mode control unit 100a.

Next, the operation of the interior air conditioning unit 2 and the seat air conditioner 5 according to the present embodiment will be described. First, the operation of the interior air conditioning unit 2 will be described. In the interior air conditioning unit 2, when the air conditioning operation switch 105a is turned on, the control device 100 controls various components of the interior air conditioning unit 2 to condition the air in the vehicle interior space 10.

First, the control device 100 calculates a target blowing temperature TAO based on detection signals of various sensor groups and operation signals of the operation panel 105. TAO is a blowing air temperature necessary for bringing the temperature of the vehicle interior space 10 closer to a set temperature Tset set by the setting switch 105b of the operation panel 105. Specifically, the control device 100 calculates TAO based on the set temperature Tset, the inside air temperature Tr, the outside air temperature Tam, and the amount of insolation Ts set by the setting switch 105b through the following Formula F1.

$$TAO = Kset \times Tset - Kr \times Tr - Kam \times Tam - Ks \times Ts + C \quad \text{F1}$$

Kset, Kr, Kam, and Ks shown in Formula F1 are control gains, and C is a correction constant.

The control device 100 determines the rotational speed of the air conditioning blower 23, and the opening degrees of the inside-outside air switch door 22c, the first to third mode doors 30a to 32a, the air mixing door 29, and so on based on the TAO, and outputs the control signal to various devices so as to obtain determined control states. The control device 100 repeats a series of processing such as read of the operation signals and detection signals, calculation of the TAO, determination of a new control state, and output of the control signals.

As a result, the air adjusted to a desired temperature by the interior air conditioning unit 2 is blown into the vehicle interior space 10, so that the temperature of the vehicle interior space 10 approaches the set temperature Tset set by the setting switch 105b.

Next, the operation of the seat air conditioner 5 will be described. When the seat operation switch 105c is turned on, the control device 100 controls the various components of the seat air conditioner 5 to blow out the air from the front side of the seat 11, or draw the air from the front side of the seat 11.

Figure 7:
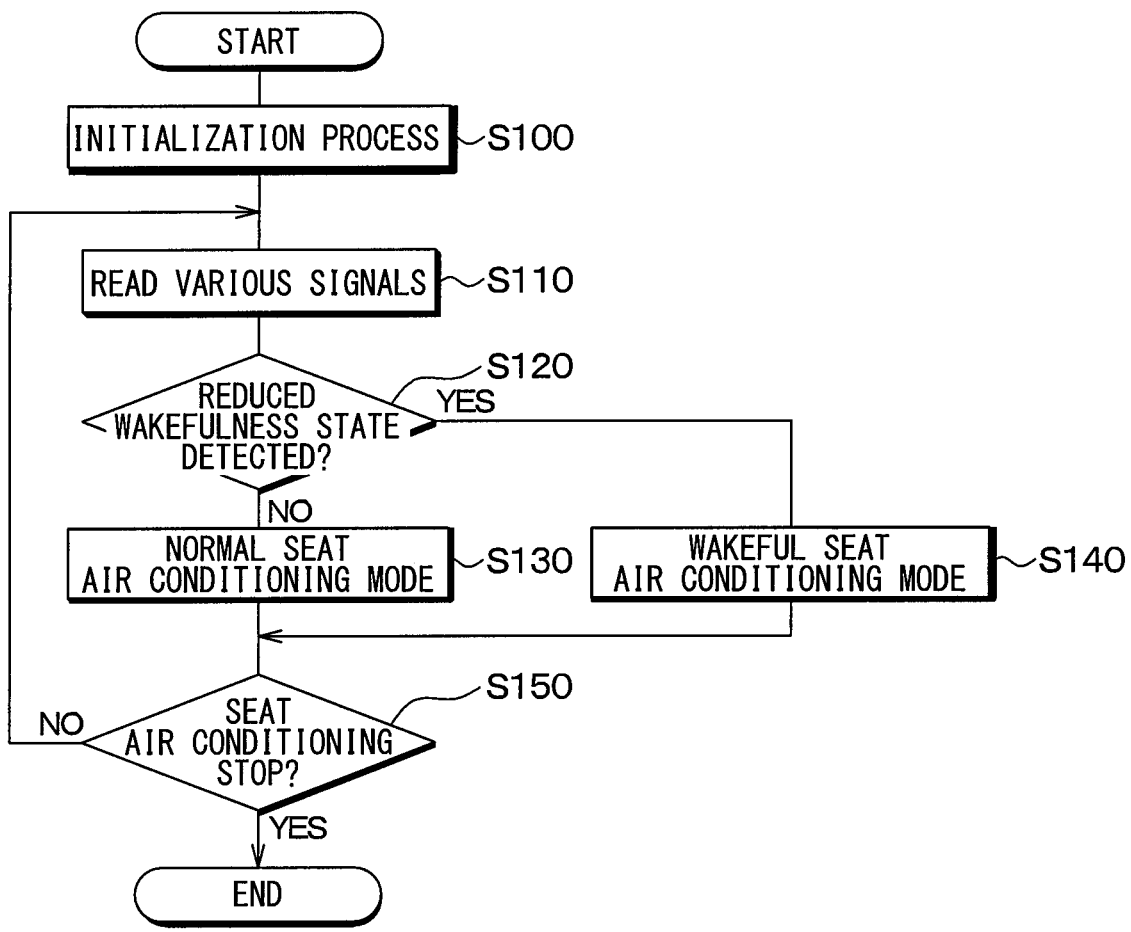
FIG. 7 is a flowchart showing a flow of a control process to be executed by a control device according to the first embodiment.

Hereinafter, a control process of the seat air conditioner 5 to be executed by the control device 100 according to the present embodiment will be described with reference to FIG. 7. FIG. 7 shows a flow of processing to be executed by the control device 100 when both of the air conditioning operation switch 105a and the seat operation switch 105c are turned on.

As shown in FIG. 7, the control device 100 executes an initialization process for initializing flags, timers, and so on in Step S100. Then, in Step S110, the control device 100 reads various signals such as the detection signals of various sensor groups and the operation signals of the operation panel 105.

Subsequently, in Step S120, the control device 100 determines whether the user is in a reduced wakefulness state, or not. Specifically, in the determination process in Step S120, the reduced wakefulness detection unit 104 determines whether the reduced wakefulness state is detected, or not.

As a result of the determination process in Step S120, if it is determined that the user is not in the reduced wakefulness state, that is, if the reduced wakefulness state is not detected by the reduced wakefulness detection unit 104, the control device 100 executes the control process in the normal seat air conditioning mode in Step S130.

In this case, for example, in an environment under the hot summer sun, heat is accumulated in the seat 11 having a large heat capacity. In that state, if the air is blown out from the front side of the seat 11, a hot air may be blown out to the occupant who is the user.

In addition, for example, in an environment under the winter extreme cold, cold is accumulated in the seat 11 having a large heat capacity. In that state, if the air is blown out from the front side of the seat 11, a cold air may be blown out to the occupant who is the user.

Therefore, in the normal seat air conditioning mode, the control device 100 according to the present embodiment first activates the seat air conditioner 5 in the suction mode, and after a predetermined time (for example, 1 minute to 5 minutes) has elapsed since activation, the control device 100 executes a control process for switching from the suction mode to the blowing mode.

More specifically, after the control device 100 operates the first suction blower 542 and the second suction blower 552 in a state where the first auxiliary blower 53 is stopped, the control device 100 stops the first suction blower 542 and the second suction blower 552 to operate the first auxiliary blower 53. When the operation of the first auxiliary blower 53 is started, the control device 100 controls the fourth mode door 33a so that the fourth air conditioning opening portion 33 is in an open state.

In this way, in the normal seat air conditioning mode, if the seat air conditioner 5 is configured to be activated in the suction mode, the heat and cold accumulated in the seat 11 can be removed. For that reason, the hot air and the cold air, which are unpleasant for the user, can be prevented from being blown out when the air is blown from the front side of the seat 11.

On the other hand, as a result of the determination process in Step S120, if it is determined that the user is in the reduced wakefulness state, that is, if the reduced wakefulness state is detected by the reduced wakefulness detection unit 104, the control device 100 executes the control process in the wakeful seat air conditioning mode in Step S140.

Specifically, the control device 100 operates the first auxiliary blower 53, the first suction blower 542, and the second suction blower 552, and also controls the fourth mode door 33a so that the fourth air conditioning opening portion 33 becomes in the open state. As a result, the air whose temperature has been adjusted by the interior air conditioning unit 2 is blown out from the front side of the seat 11 and the air around the seat 11 is drawn from the front side of the seat 11.

Specifically, in the seat cushion portion 12 and the seat back portion 13, the air whose temperature has been adjusted by the interior air conditioning unit 2 is blown out through the main blowing duct 51. At the same time, in the seat cushion portion 12, the air around the seat cushion portion 12 is drawn through the first suction duct 54. In the seat back portion 13, the air around the seat cushion portion 12 is drawn through the second suction duct 55.

After the process in Step S130 or the process in Step S140, the control device 100 determines whether to stop the seat air conditioner 5, or not, in Step S150. Specifically, in the determination process of Step S150, it is determined that the seat air conditioner 5 is to be stopped when the seat operation switch 105c is turned off, and it is determined that the seat air conditioner 5 is not to be stopped when the seat operation switch 105c is kept on.

When it is determined that the seat air conditioner 5 is to be stopped in the determination processing of Step S150, the control device 100 stops an operating blower among the first auxiliary blower 53, the first suction blower 542, and the second suction blower 552.

On the other hand, when it is determined that the seat air conditioner 5 is not to be stopped in the determination process of step S150, the control device 100 maintains an operation state of the operating blower among the first auxiliary blower 53, the first suction blower 542, and the second suction blower 552.

In the seat air conditioner 5 according to the present embodiment described above, the multiple air flow ducts such as the main blowing duct 51, the first suction duct 54, and the second suction duct 55 are provided on both of the seat cushion portion 12 and the seat back portion 13. In the seat air conditioner 5 according to the present embodiment, the main blowing duct 51 is configured to be independent from the first suction duct 54 and the second suction duct 55 so as to enable air at a different temperature from the inside air to flow through the main blowing duct 51. Specifically, in the seat air conditioner 5 according to the present embodiment, the main blowing duct 51, the first suction duct 54, and the second suction duct 55 are independent of each other.

According to the above configuration, in the seat air conditioner 5 of the present embodiment, air at different air volumes, temperatures, and so on can flow through the multiple air flow ducts provided in both the seat back portion 13 and the seat cushion portion 12. As a result, the seat air conditioner 5 according to the present embodiment can impart different thermal sensations to the user in both the seat back portion 13 and the seat cushion portion 12.

In this manner, when the different thermal sensations are given to the user, since it is difficult to impart a biased thermal sensation such as excessive cooling or excessive heat over the entire seat 11 or excessive heat to the user, comfort of the user can be ensured.

Further, according to the present embodiment, some of the multiple air flow ducts provided in both of the seat cushion portion 12 and the seat back portion 13 are used for blowing the air whose temperature has been adjusted by the interior air conditioning unit 2, and the remaining air flow ducts are used for suction the air. In other words, according to the present embodiment, the main blowing duct 51 among the multiple air flow ducts is used for blowing out the air whose temperature has been adjusted by the interior air conditioning unit 2, and the remaining first suction duct 54 and second suction duct 55 are used for suction the air.

According to the above configuration, since comfortable air whose temperature has been adjusted by the interior air conditioning unit 2 can be blown to the user, the comfort of the user can be ensured with a simple configuration as compared with a configuration in which the temperature of the air blown from the seat 11 is adjusted by a dedicated device.

More particularly, in the configuration in which both of the air blowing and the air suctioning are performed at the same time in both of the seat back portion 13 and the seat cushion portion 12 as in the present embodiment, different heat sensations can be imparted to the user with a great change in a wind direction in the vicinity of the seat 11. This is also effective in preventing user's drowsiness.

Further, in the seat air conditioner 5 according to the present embodiment, the multiple air flow ducts, that is, the main blowing duct 51 and the second suction duct 55 are provided in the seat back portion 13. For that reason, different thermal sensations can be imparted to the upper body of the user who is sensitive to a temperature change. As a result, drowsiness can be prevented by providing the user with an opportunity to perceive the temperature change of a skin surface.

In particular, in the seat air conditioner 5 according to the present embodiment, the second blowing opening portion 512 is provided in the waist support portion 130a which is the high seat pressure portion in the seat back portion 13, and the second suction opening portion 511 is provided in the back support portion 130b. According to the above configuration, since the air having a temperature difference from the inside air can be supplied from the high seat pressure portion supporting the user's waist in the seat back portion 13, a sufficient thermal sensation can be provided to the user. Further, in the structure in which the air is drawn from portions other than the high seat pressure portion in the seat back portion 13, since a sufficient suction amount of air can be secured, the different heat sensations can be easily imparted to the user. Therefore, in the seat air conditioner 5 of the present embodiment, the comfort of the user can be improved while preventing wetting and so on in the upper body of the user.

Further, in the seat air conditioner 5 according to the present embodiment, the multiple air flow ducts, that is, the main blowing duct 51 and the first suction duct 54 are provided in the seat cushion portion 12. According to the above configuration, since the different thermal sensations can be imparted to the lower body of the user who is liable to be wetted when in contact with the seat 11, comfort of the user can be improved.

In particular, in the seat air conditioner 5 according to the present embodiment, the first blowing opening portion 511 is provided in the buttocks support portion 120a which is the high seat pressure portion in the seat cushion portion 12, and the first suction opening portion 541 is provided in the thigh support portion 120b. According to the above configuration, since the air having a temperature difference from the inside air can be supplied from the high seat pressure portion supporting the user's buttocks in the seat cushion portion 12, a sufficient thermal sensation can be provided to the user. Further, in the structure in which the air is drawn from portions other than the high seat pressure portion in the seat cushion portion 12, since a sufficient suction amount of air can be secured, the different heat sensations can be easily imparted to the user. Therefore, as a result, in the seat air conditioner 5 of the present embodiment, the comfort of the user can be improved while preventing wetting and so on in the lower body of the user.

Further, when the wakefulness level of the user is reduced, the control device 100 according to the present embodiment executes a control process of blowing out the air whose temperature has been adjusted by the interior air conditioning unit 2 from the front side of the seat 11 through the main blowing duct 51. More specifically, when the wakefulness level of the user is reduced, the control device 100 according to the present embodiment executes the control process for implementing blowing of the air whose temperature has been adjusted by the interior air conditioning unit 2 from the main blowing duct 51 and the suction of the air into the respective suction ducts 54 and 55 at the same time.

According to the above configuration, when the wakefulness level of the occupant is reduced, the air having a temperature different from that of the air flowing in the respective suction ducts 54 and 55 through the main air flow duct 51 is blown out from the front side of the seat 11 so that the different heat sensations can be imparted to the user. Imparting the different thermal sensations to the user provides the user with an opportunity to perceive the temperature change of the skin surface, and the wakefulness level of the occupant can be restored.

In the present embodiment, the seat air conditioner 5 in which the main blowing duct 51, the first suction duct 54, and the second suction duct 55 are configured independently from each other has been illustrated, but the present disclosure is not limited to the above seat air conditioner. For example, even if the air flowing through the first suction duct 54 is mixed with the air flowing through the second suction duct 55, the first suction duct 54 and the second suction duct 55 hardly affect the thermal sensation of the user seated on the seat 11. For that reason, a part of those ducts may be shared with each other so that the air flowing through the first suction duct 54 and the second suction duct 55 is mixed with each other.

(Second Embodiment)

Figure 8:
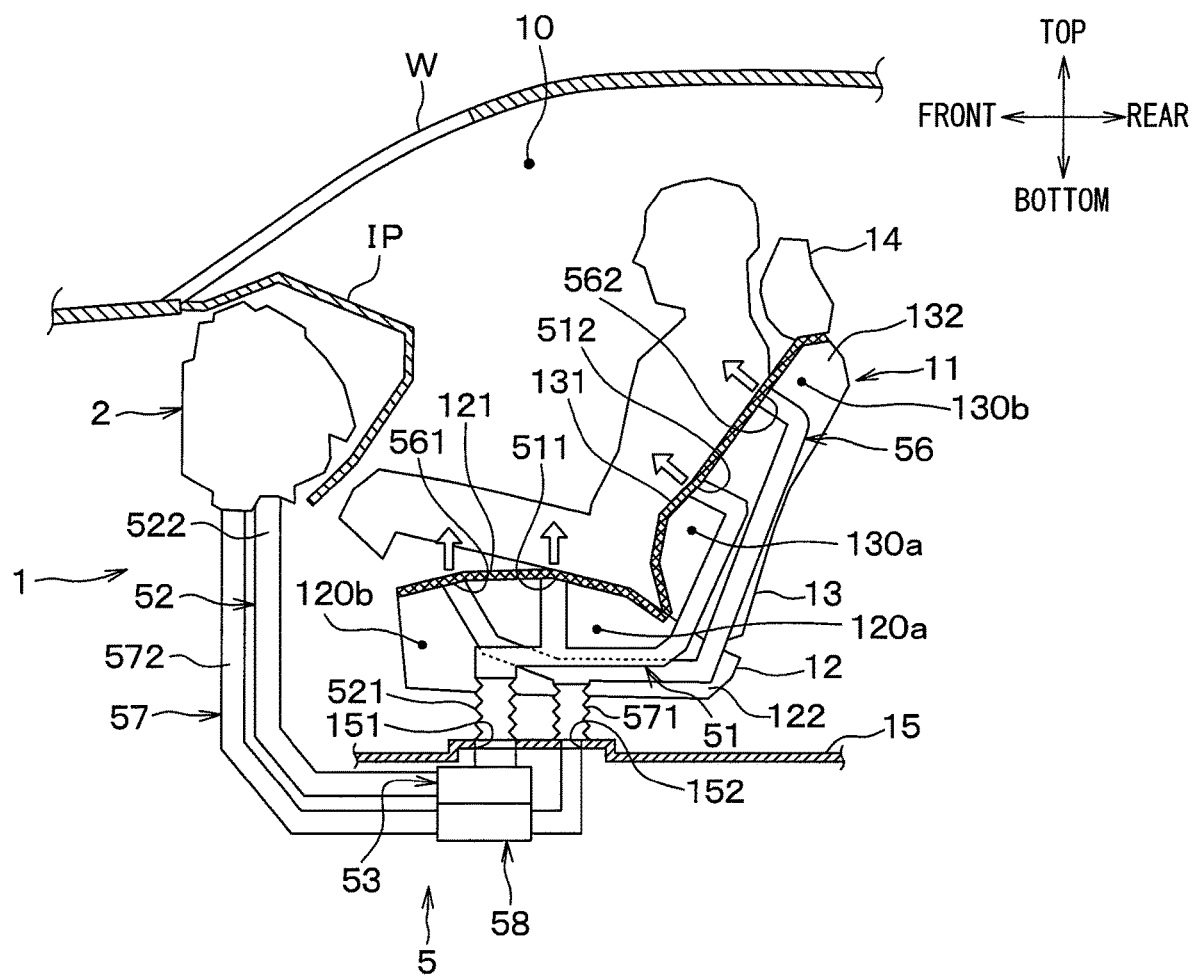
FIG. 8 is a schematic configuration diagram of an air conditioning device for a vehicle including a seat air conditioner according to a second embodiment.

Next, a second embodiment will be described with reference to FIGS. 8 and 9. A seat air conditioner 5 according to the present embodiment is different from the first embodiment in that air at different temperatures can be blown out in both of a seat cushion portion 12 and a seat back portion 13 at the same time.

The seat air conditioner 5 according to the present embodiment is provided with an auxiliary blowing duct 56 instead of the first suction duct 54 and the second suction duct 55 described in the first embodiment. In other words, as shown in FIG. 8, the seat cushion portion 12 and the seat back portion 13 according to the present embodiment each include an auxiliary blowing duct 56 that defines an air flow passage of the air blown from a front side of a seat 11 in addition to a main blowing duct 51. The auxiliary blowing duct 56 is disposed across both of the seat cushion portion 12 and the seat back portion 13.

The auxiliary blowing duct 56 is provided with a third blowing opening portion 561 and a fourth blowing opening portion 562 which open to skin members 121 and 131 side of the seat cushion portion 12 and the seat back portion 13, respectively. In the present embodiment, a first blowing opening portion 511 and a second blowing opening portion 512 form a first blowing portion that communicates with the main blowing duct 51, and the third blowing opening portion 561 and the fourth blowing opening portion 562 form a second blowing portion that communicates with the auxiliary blowing duct 56.

The fourth blowing opening portion 562 of the auxiliary blowing duct 56 is provided above the second blowing opening portion 512 of the main blowing duct 51 in the seat back portion 13 according to the present embodiment. Specifically, in the seat back portion 13, the second blowing opening portion 512 is provided in the waist support portion 130a which is a high seat pressure portion, and the fourth suction opening portion 562 is provided in the back support portion 130b which is a portion other than the high seat pressure portion.

The third blowing opening portion 561 of the auxiliary blowing duct 56 is provided in front of the first blowing opening portion 511 of the main blowing duct 51 in the seat cushion portion 12 according to the present embodiment. Specifically, in the seat cushion portion 12 according to the present embodiment, the first blowing opening portion 511 is provided in the buttocks support portion 120a which is a high seat pressure portion, and the third suction opening portion 561 is provided in the thigh support portion 120b which is a portion other than the high seat pressure portion.

The auxiliary blowing duct 56 according to the present embodiment is branched inside the seat 11 such that the air can be blown out from both of the third blowing opening portion 561 in the seat cushion portion 12 and the fourth blowing opening portion 562 in the seat back portion 13. The auxiliary blowing duct 56 is connected to the interior air conditioning unit 2 through the auxiliary duct member 57 so that the air whose temperature has been adjusted by the interior air conditioning unit 2 flows through those ducts.

Figure 9:
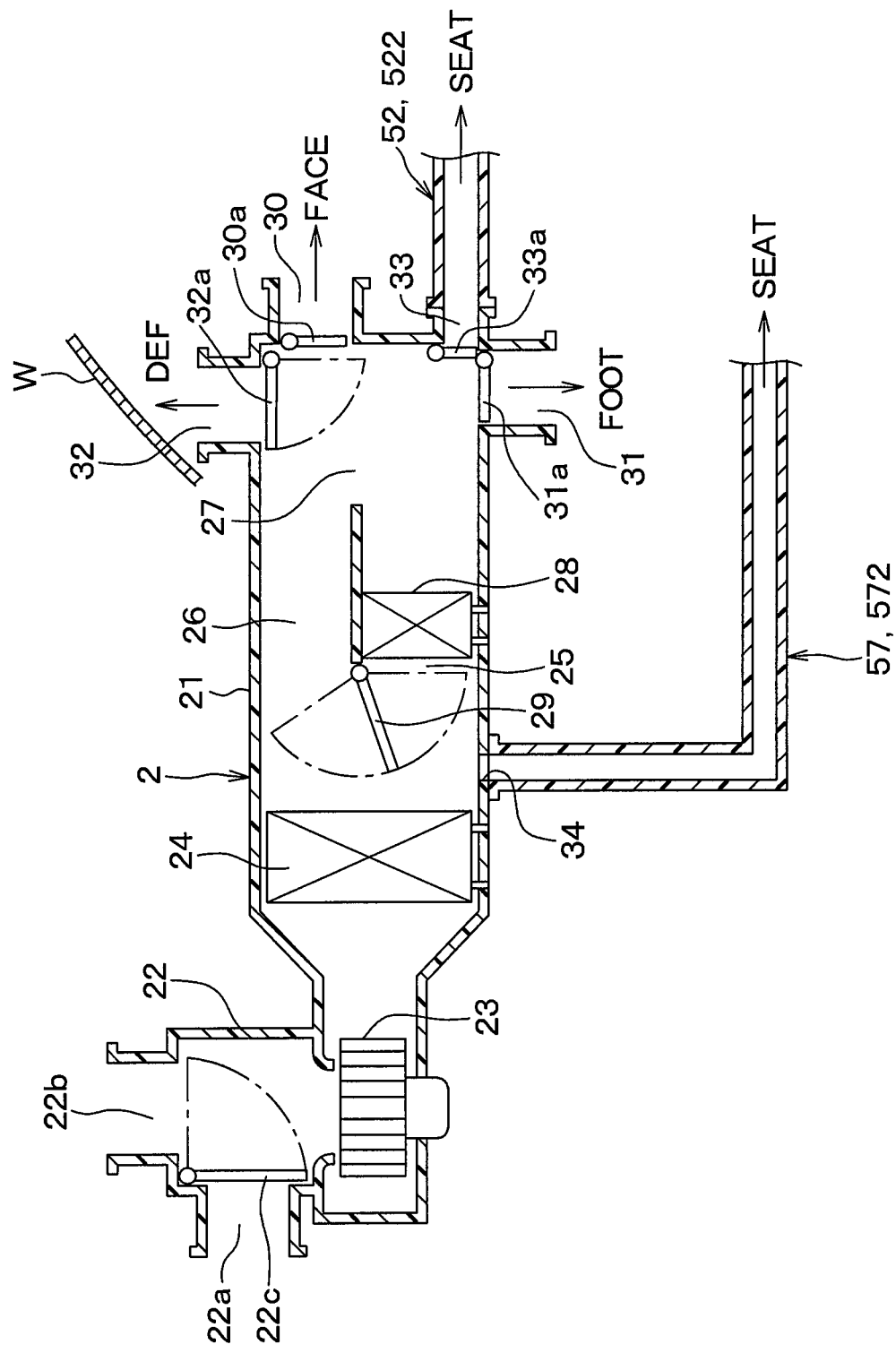
FIG. 9 is a schematic configuration diagram of an interior air conditioning unit shown in FIG. 8.

As shown in FIG. 9, in the air conditioning case 21 of the interior air conditioning unit 2 according to the present embodiment, an intermediate opening portion 34 through which the air having passed through an evaporator 24 flow out to an outside is provided between the evaporator 24 and a heater core 28.

The auxiliary blowing duct 56 is connected to the intermediate opening portion 34 of the interior air conditioning unit 2 through the auxiliary duct member 57 so that the air at a different temperature from the air flowing through the main blowing duct 51 flows through the auxiliary blowing duct 56.

In this example, the auxiliary duct member 57 includes a seat connection portion 571 and an air conditioning connection portion 572. One end side of the seat connection portion 571 is connected to an end of the auxiliary blowing duct 56 on a back side of the seat 11 and the other end side of the seat connection portion 571 is connected to a through hole 152 provided in a floor surface 15 of the vehicle. The seat connection portion 571 is formed of a bellows-shaped duct so as to cope with a movement of the seat 11 in a vertical direction and a longitudinal direction. Incidentally, a duct other than the bellows-shaped duct may be adopted as the seat connection portion 571 as long as the duct has flexibility.

One end side of the air conditioning connection portion 572 is connected to the through hole 152 of the floor surface 15 and the other end side of the air conditioning connection portion 572 is connected to the intermediate opening portion 34 of the interior air conditioning unit 2. The air conditioning connection portion 572 is disposed below the floor surface 15 and inside the instrument panel IP so as not to affect a design property of the vehicle interior space 10.

The air conditioning connection portion 572 is provided with a second auxiliary blower 58 for assisting the air blowing from the interior air conditioning unit 2 side to the auxiliary blowing duct 56 side. The second auxiliary blower 58 is an electric blower capable of changing a rotational speed according to the control signal from the control device 100 to be described later. A centrifugal fan, an axial flow fan, a cross flow fan, or the like can be adopted as a fan of the auxiliary blower 58.

The main blowing duct 51 and the auxiliary blowing duct 56 according to the present embodiment are configured to be independent from each other so that the air flowing through the main blowing duct 51 and the auxiliary blowing duct 56 is not mixed with each other. In other words, the main blowing duct 51 and the auxiliary blowing duct 56 are configured so as not to communicate with each other inside the seat 11.

In the present embodiment, the main blowing duct 51 and the auxiliary blowing duct 56 form two independent air flow passages in both of the seat cushion portion 12 and the seat back portion 13. In the present embodiment, the main blowing duct 51 and the auxiliary blowing duct 56 form multiple air flow ducts provided in both of the seat cushion portion 12 and the seat back portion 13.

Next, the operation of the seat air conditioner 5 according to the present embodiment will be described. The control processing to be executed by the control device 100 according to the present embodiment is different from the first embodiment only in the contents of a normal seat air conditioning mode shown in Step S130 of FIG. 7 and a wakeful seat air conditioning mode shown in Step S140 of FIG. 7, and the other processing is the same as in the first embodiment.

In the normal seat air conditioning mode shown in Step S130 in FIG. 7, the control device 100 according to the present embodiment actuates the first auxiliary blower 53 provided in the main duct member 52 in a state where the second auxiliary blower 58 provided in the auxiliary duct member 57 is stopped. When the operation of the first auxiliary blower 53 is started, the control device 100 controls the fourth mode door 33a so that the fourth air conditioning opening portion 33 is in an open state.

As a result, the air whose temperature has been adjusted by the interior air conditioning unit 2, that is, the air whose temperature has been adjusted by the evaporator 24 and the heater core 28 is blown out from the front side of the seat 11.

On the other hand, in the wakeful seat air conditioning mode shown in Step S140 in FIG. 7, the control device 100 according to the present embodiment actuates both of the first auxiliary blower 53 provided in the main duct member 52 and the second auxiliary blower 58 provided in the auxiliary duct member 57. When the operation of the first auxiliary blower 53 is started, the control device 100 controls the fourth mode door 33a so that the fourth air conditioning opening portion 33 is in an open state.

As a result, the air whose temperature has been adjusted by the evaporator 24 and the heater core 28 of the interior air conditioning unit 2 is blown out from the front surface of the seat 11, and the cold air that has passed through the evaporator 24 of the interior air conditioning unit 2 is blown from the front surface of the seat 11.

Specifically, in the seat cushion portion 12 and the seat back portion 13, the air whose temperature has been adjusted by the evaporator 24 and the heater core 28 in the interior air conditioning unit 2 is blown out through the main blowing duct 51. At the same time, in the seat cushion portion 12 and the seat back portion 13, the cold air that has passed through the evaporator 24 of the interior air conditioning unit 2 is blown out through the auxiliary blowing duct 56.

Other configurations are the same as in the first embodiment. The seat air conditioner 5 according to the present embodiment can obtain the same operational advantages as those in the first embodiment, which are obtained from the configuration common to the first embodiment.

In the seat air conditioner 5 according to the present embodiment, the multiple air flow ducts provided in both of the seat cushion portion 12 and the seat back portion 13 are connected to the interior air conditioning unit 2 separately, such that the air flowing therein is different in temperature from each other. In other words, in the seat air conditioner 5 according to the present embodiment, the main blowing duct 51 and the auxiliary blowing duct 56 provided in both of the seat cushion portion 12 and the seat back portion 13 are connected to the interior air conditioning unit 2, separately so that the air flowing therein is different in temperature from each other.

According to the above configuration, air at different temperatures can be blown out at the same time from the multiple air flow ducts provided in both of the seat cushion portion 12 and the seat back portion 13. In particular, in a configuration capable of blowing out air at different temperatures at the same time, since the different thermal sensations can be easily imparted to the user, the above configuration is preferable for prevention of drowsiness of the user and partial temperature adjustment in the seat 11.

In this example, in the present embodiment, an example in which the second auxiliary blower 58 is disposed in the auxiliary duct member 57 has been described, but the present disclosure is not limited to the above example. The air blown from the air conditioning blower 23 also flows into the auxiliary duct member 57. For that reason, the second auxiliary blower 58 may be omitted. In that case, there is a possibility that the air may be blown out from the front side of the seat 11 through the auxiliary duct member 57 unintentionally. For that reason, it is preferable to provide an opening and closing door for opening/closing the intermediate opening portion 34 in the interior air conditioning unit 2.

(Modification of Second Embodiment)

Figure 10:
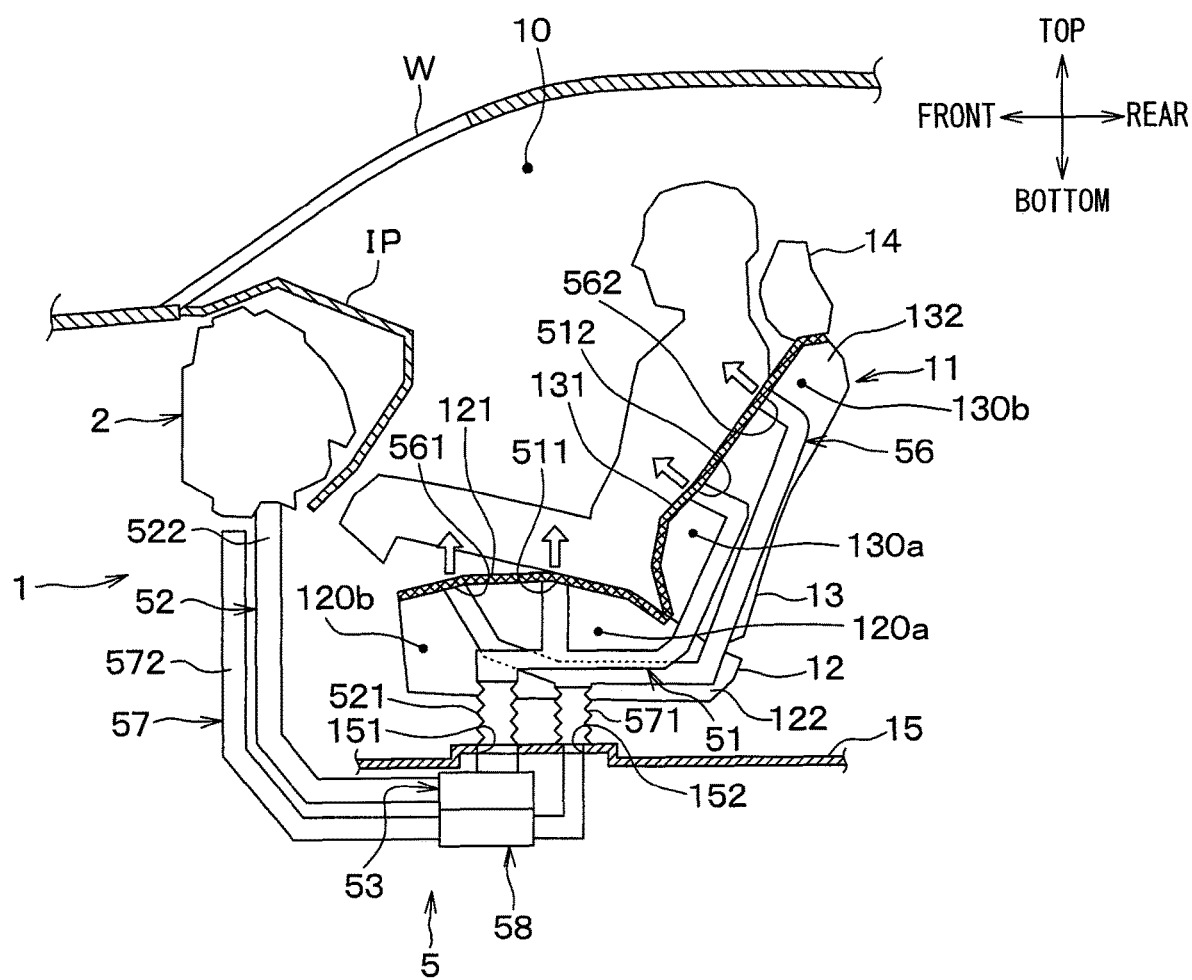
FIG. 10 is a schematic configuration diagram showing a modification of a seat air conditioner according to a second embodiment.

In the second embodiment, the auxiliary blowing duct 56 is connected to the interior air conditioning unit 2 through the auxiliary duct member 57, but the present disclosure is not limited to the above example. For example, as shown in FIG. 10, the auxiliary blowing duct 56 may be configured to communicate with the vehicle interior space 10 through the auxiliary duct member 57 so that the inside air flows through the auxiliary blowing duct 56.

In this way, if the air whose temperature has been adjusted by the interior air conditioning unit 2 is blown out by some of the air flow ducts and the inside air is blown out by the other air flow ducts, air at different temperatures can be blown out from both the seat back portion 13 and the seat cushion portion 12 at the same time. In particular, in a configuration capable of blowing out air at different temperatures at the same time, since the different thermal sensations can be easily imparted to the user, the above configuration is preferable for prevention of drowsiness of the user and partial temperature adjustment in the seat 11.

(Third Embodiment)

Next, a third embodiment will be described with reference to FIGS. 11 and 12. A seat air conditioner 5 according to the present embodiment is different from the second embodiment in that a cold air can be blown out to a user's neck through an auxiliary blowing duct 56.

Figure 11:
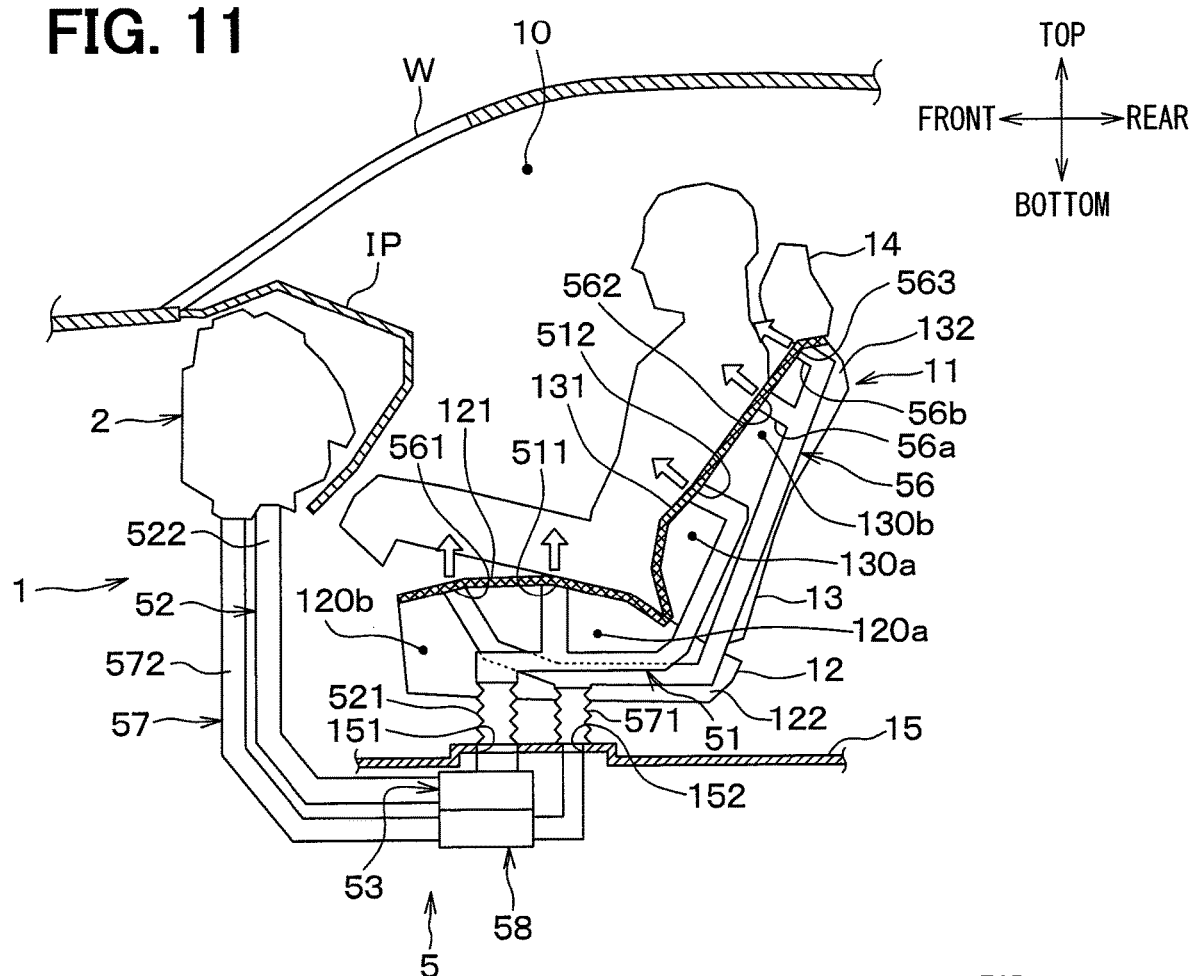
FIG. 11 is a schematic configuration diagram of an air conditioning device for a vehicle including a seat air conditioner according to a third embodiment.
Figure 12:
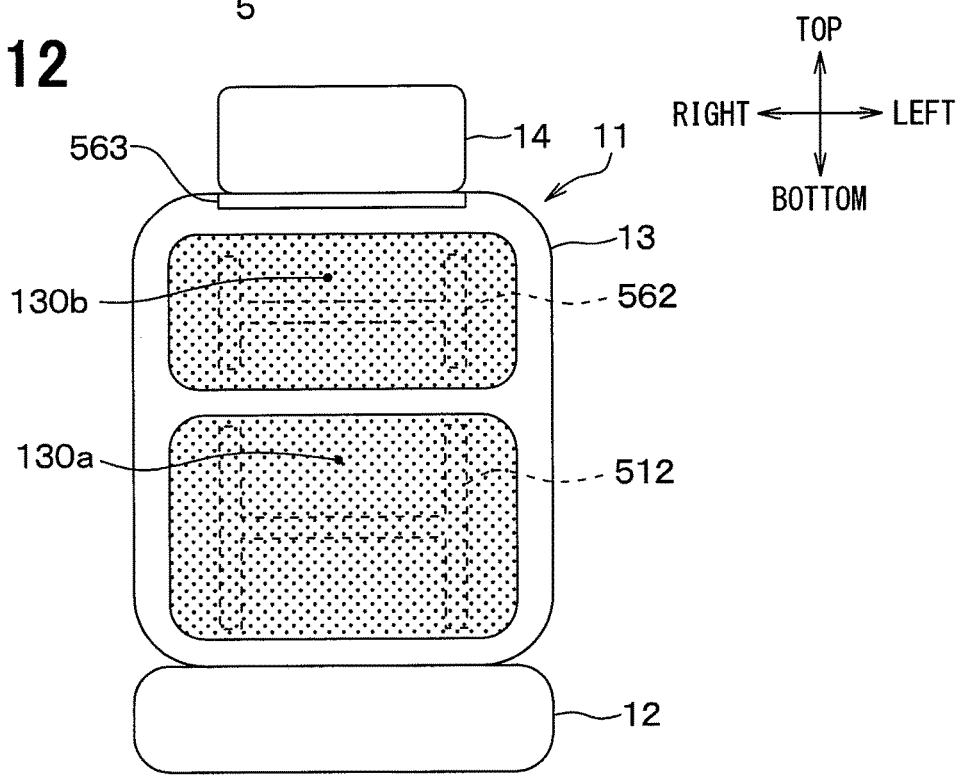
FIG. 12 is a front view of a seat showing a front side of a seat back portion according to the third embodiment.

As shown in FIGS. 11 and 12, the auxiliary blowing duct 56 according to the present embodiment is branched into two pieces inside a seat back portion 13. The auxiliary blowing duct 56 has a fourth blowing opening portion 562 on one end side of one branch portion 56a branched inside the seat back portion 13 and a neck blowing opening portion 563 on one end side of the other branch portion 56b.

The fourth blowing opening portion 562 provided in one branch portion 56a according to the present embodiment opens to a portion facing a back portion of the user, that is, a portion on an upper side of the seat back portion 13

Further, the neck blowing opening portion 563 provided in the other branch portion 56b according to the present embodiment opens to a portion facing the neck of the user, that is, a portion of the seat back portion 13 above the fourth blowing opening portion 562.

Other configurations are identical with those in the second embodiment. The seat air conditioner 5 according to the present embodiment can obtain the same operational advantages as those in the second embodiment, which are obtained from the configuration common to the second embodiment.

In the seat air conditioner 5 according to the present embodiment, the fourth blowing opening portion 562 and the neck blowing opening portion 563 of the auxiliary blowing duct 56 are provided at a portion corresponding to the back portion of the user and a portion corresponding to the neck of the user in the seat back portion 13. According to the above configuration, the cold air can be blown out to the neck of the user who is likely to be exposed from clothes and the like in addition to the back portion of the user who is unlikely to be subject to a pressure by the user's body. For that reason, drowsiness can be prevented by causing the user to perceive a change in temperature of a skin surface.

In the present embodiment, an example in which both of the two branch portions 56a and 56b of the auxiliary blowing duct 56 are provided inside the seat back portion 13 has been described, but the present invention is not limited to the above example. For example, one of the two branch portions 56a and 56b of the auxiliary blowing duct 56, that is, the branch portion 56b opening to the neck of the user may be disposed outside the seat back portion 13. With such a configuration, the temperature of the air blown out through the branch portion 56b opening to the neck of the user can be prevented from changing due to the cold and hot stored in the seat back portion 13.

(Fourth Embodiment)

Figure 13:
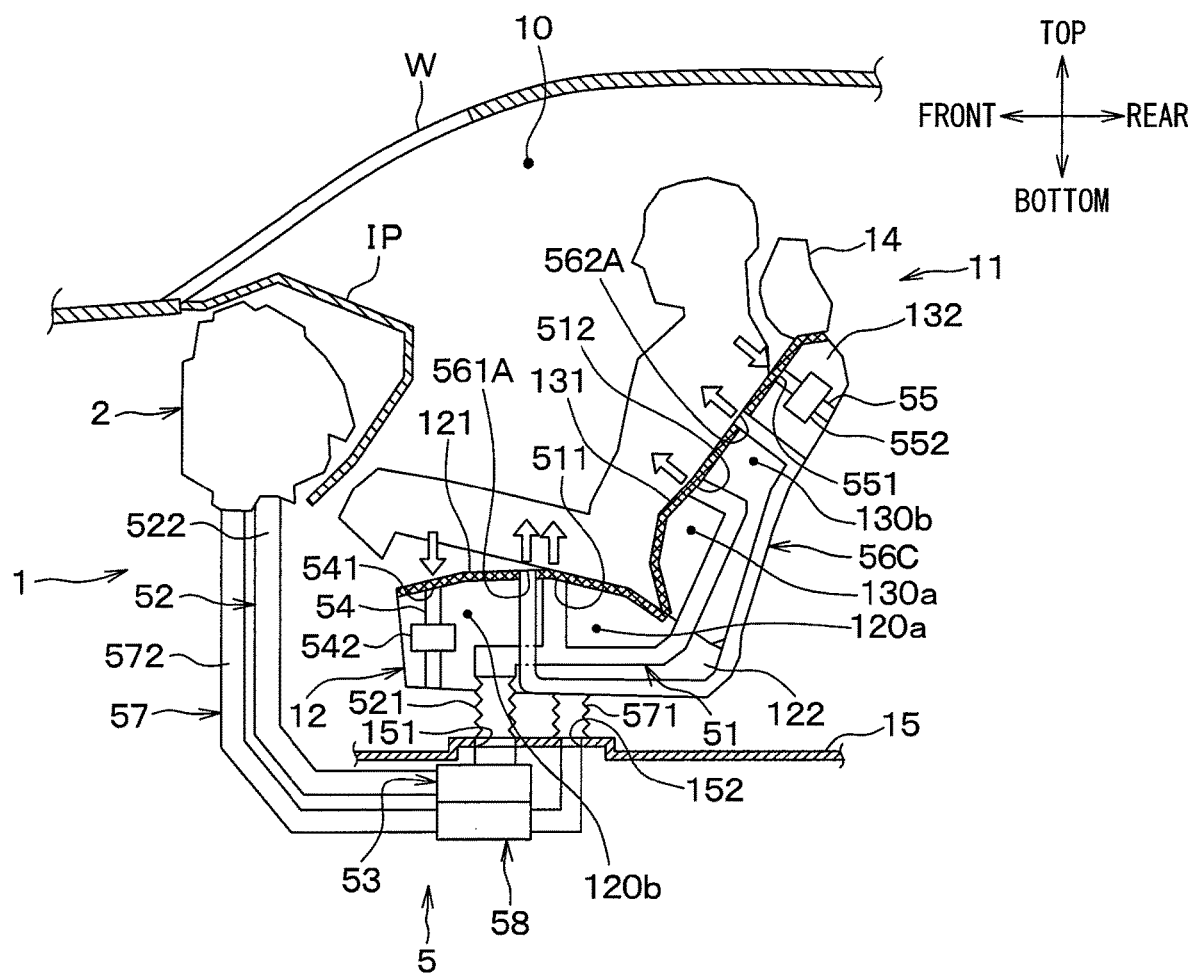
FIG. 13 is a schematic configuration diagram of an air conditioning device for a vehicle including a seat air conditioner according to a fourth embodiment.

Next, a fourth embodiment will be described with reference to FIGS. 13 to 15. The present embodiment is different from the first embodiment in that air different in temperature can be blown out from both of a seat cushion portion 12 and a seat back portion 13 at the same time.

A seat air conditioner 5 according to the present embodiment is provided with an auxiliary blowing duct 56C in addition to a main blowing duct 51, a first suction duct 54 and a second suction duct 55 described in the first embodiment. In other words, as shown in FIG. 13, the seat cushion portion 12 and the seat back portion 13 according to the present embodiment each include an auxiliary blowing duct 56C defining an air flow passage of the air blown from a front side of a seat 11.in addition to a main blowing duct 51.

The auxiliary blowing duct 56C according to the present embodiment is provided not along an inside of pad members 122 and 132 of the seat cushion portion 12 and the seat back portion 13 but along outer surfaces of both the seat cushion part 12 and the seat back part 13.

A third blowing opening portion 561A and a fourth blowing opening portion 562A which are opened on both sides in a vehicle width direction (that is, a right and left direction) are provided in the auxiliary blowing duct 56C on the respective front side of the seat cushion portion 12 and the seat back portion 13.

Figure 14:
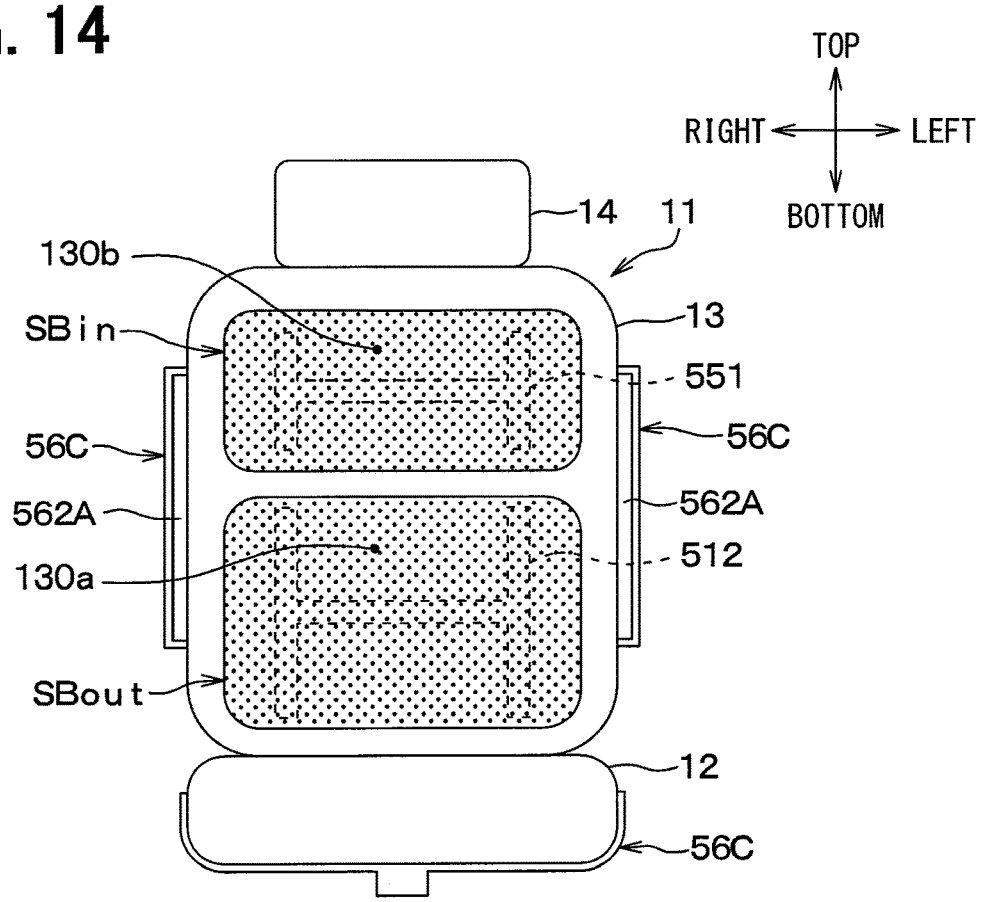
FIG. 14 is a front view of a seat showing a front side of a seat back portion according to a fourth embodiment.

As shown in FIG. 14, in the seat back portion 13 of the present embodiment, the fourth blowing opening portion 562A of the auxiliary blowing duct 56C is provided outside the second blowing opening portion 512 of the main blowing duct 51 in the vehicle width direction (that is, the right and left direction).

Figure 15:
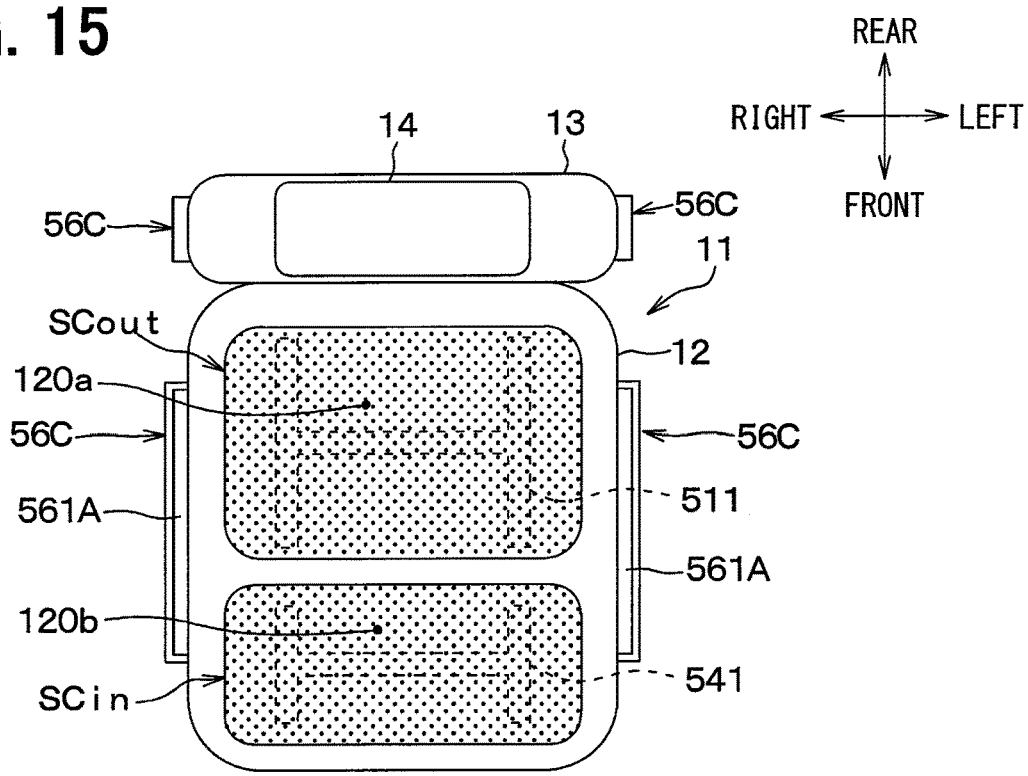
FIG. 15 is a top view of a seat showing a front side of a seat cushion portion according to the fourth embodiment.

As shown in FIG. 15, in the seat cushion portion 12 according to the present embodiment, the third blowing opening portion 561A of the auxiliary blowing duct 56C is provided outside the first blowing opening portion 511 of the main blowing duct 51 in the vehicle width direction (that is, the right and left direction).

The auxiliary blowing duct 56C according to the present embodiment is branched outside the seat 11 such that the air can be blown out from both of the third blowing opening portion 561A in the seat cushion portion 12 and the fourth blowing opening portion 562A in the seat back portion 13.

Similar to the auxiliary blowing duct 56 described in the second embodiment, the auxiliary blowing duct 56C according to the present embodiment is connected to the interior air conditioning unit 2 through the auxiliary duct member 57 so that the air flowing inside the interior air conditioning unit 2 flows through the auxiliary blowing duct 56C. As in the second embodiment, the auxiliary duct member 57 according to the present embodiment is connected to an intermediate opening portion 34 of the interior air conditioning unit 2.

Unlike the main blowing duct 51, since the auxiliary blowing duct 56C according to the present embodiment is provided outside the seat 11, the air flowing inside the auxiliary blowing duct 56C is not mixed with the air flowing inside the main blowing duct 51.

In the present embodiment, the main blowing duct 51, the first suction duct 54, the second suction duct 55, and the auxiliary blowing duct 56C form three air flow passages independent from each other in both of the seat cushion portion 12 and the seat back portion 13.

In the present embodiment, the main blowing duct 51, the first suction duct 54, and the auxiliary blowing duct 56C form multiple air flow ducts provided inside the seat cushion portion 12. In the present embodiment, the main blowing duct 51, the second suction duct 55, and the auxiliary blowing duct 56CA form multiple air flow ducts provided in the seat back portion 13.

Next, the operation of the seat air conditioner 5 according to the present embodiment will be described. The control processing to be executed by the control device 100 according to the present embodiment is different from the first embodiment only in the contents of a normal seat air conditioning mode shown in Step S130 of FIG. 7 and a wakeful seat air conditioning mode shown in Step S140 of FIG. 7, and the other processing is the same as in the first embodiment.

In the normal seat air conditioning mode shown in Step S130 in FIG. 7, the control device 100 according to the present embodiment actuates the first suction blower 542 and the second suction blower 552 in a state where the first auxiliary blower 53 and the second auxiliary blower 58 is stopped. Then, after a predetermined period (for example, 1 to 5 minutes) has been elapsed since the control device 100 has operated the first suction blower 542 and the second suction blower 552, the control device 100 stops the first suction blower 542 and the second suction blower 552 to operate the first auxiliary blower 53. When the operation of the first auxiliary blower 53 is started, the control device 100 controls the fourth mode door 33a so that the fourth air conditioning opening portion 33 is in an open state.

In this way, in the normal seat air conditioning mode, if the seat air conditioner 5 is configured to be activated in the suction mode, the heat and cold accumulated in the seat 11 can be removed. For that reason, the hot air and the cold air, which are unpleasant for the user, can be prevented from being blown out when the air is blown from the front side of the seat 11.

In the wakeful seat air conditioning mode shown in Step S140 in FIG. 7, the control device 100 according to the present embodiment actuates the first auxiliary blower 53, the second auxiliary blower 58, the first suction blower 542, and the second suction blower 552. When the operation of the first auxiliary blower 53 is started, the control device 100 controls the fourth mode door 33a so that the fourth air conditioning opening portion 33 is in an open state.

As a result, the air whose temperature has been adjusted by the evaporator 24 and the heater core 28 in the interior air conditioning unit 2 is blown out from the front side of the seat 11 and the air around the seat 11 is drawn from the front side of the seat 11. Further, the cold air having passed through the evaporator 24 of the interior air conditioning unit 2 is blown out from the front side of the seat 11.

The other configurations are the same as in the first and second embodiments. The seat air conditioner 5 according to the present embodiment can obtain the same operational advantages as those in the first and second embodiments, which are obtained from the configuration common to the first and second embodiments.

In the present embodiment, some of the multiple ventilation paths provided in both of the seat cushion portion 12 and the seat back portion 13 are used for blowing out the air whose temperature has been adjusted by the interior air conditioning unit 2 and the cold air that flows inside the interior air conditioning unit 2, and the remaining air flow passages are used for drawing the air. According to the above configuration, since air different in temperature can be blown from the front side of the seat 11 and a wind direction in the vicinity of the seat 11 can be largely changed, different thermal sensations can be reliably imparted to the user. Therefore, according to the seat air conditioner 5 of the present embodiment, drowsiness can be prevented and partial temperature adjustment in the seat 11 can be performed.

(Fifth Embodiment)

Next, a fifth embodiment will be described with reference to FIGS. 16 and 17. The present embodiment is different from the first embodiment in that the placement of the first blowing opening portion 511, the second blowing opening portion 512, the first suction opening portion 541, and the second suction opening portion 551 in the seat 11 is changed.

In this example, a center portion of the seat back portion 13 on the lower side in a vehicle width direction (that is, a right and left direction) tends to be more subject to a pressure by the user's body than a portion surrounding the center portion. As a result, when the air is blown out from the front side of the seat 11, in the center portion of the seat back portion 13 on the lower side in the vehicle width direction air, a pressure loss of the air is large, which makes it difficult to secure a sufficient blowing air volume.

Therefore, as shown in FIG. 16, according to the present embodiment, the second suction opening portion 551 of the second suction duct 55 is opened on both sides of the seat back portion 13 in the vehicle width direction, and the second blowing opening portion 512 of the main blowing duct 51 is opened in a center portion of the seat back portion 13. Specifically, in the present embodiment, the second suction opening portion 551 of the second suction duct 55 provided in the seat back portion 13 is U-shaped, and the second blowing opening portion 512 of the main blowing duct 51 is provided inside the second suction opening 551.

On the other hand, a center portion of the seat cushion portion 12 on a rear side in a vehicle width direction (that is, a right and left direction) tends to be more subject to a pressure by the user's body than a portion surrounding the center portion. As a result, when the air is blown out from the front side of the seat 11, in the center portion of the seat cushion portion 12 on the rear side in the vehicle width direction air, a pressure loss of the air is large, which makes it difficult to secure a sufficient blowing air volume.

Therefore, as shown in FIG. 17, according to the present embodiment, the first suction opening portion 541 of the first suction duct 54 is opened on both sides of the seat cushion portion 12 in the vehicle width direction, and the first blowing opening portion 511 of the main blowing duct 51 is opened in a center portion of the seat cushion portion 12. More specifically, in the present embodiment, the first suction opening portion 541 of the first suction duct 54 provided in the seat cushion portion 12 is U-shaped, and the first blowing opening portion 511 of the main blowing duct 51 is provided inside the first suction opening 541.

Other configurations are the same as in the first embodiment. The seat air conditioner 5 according to the present embodiment can obtain the same operational advantages as those in the first embodiment, which are obtained from the configuration common to the first embodiment.

In the present embodiment, the air adjusted in temperature by the interior air conditioning unit 2 is blown out to portions of the seat cushion portion 12 and the seat back portion 13 where a pressure of the user's body is liable to be applied. According to the above configuration, since the air having a temperature difference from the inside air can be supplied from the high seat pressure portion of the seat 11 which supports the user's buttocks, a sufficient thermal sensation can be imparted to the user.

In addition according to the present embodiment, the air is drawn from portions of the seat cushion portion 12 and the seat back portion 13 to which the pressure by the user's body is unlikely to be applied. With the structure described above, since the amount of drawn air can be sufficiently secured, the different thermal sensations can be easily imparted to the user.

According to the present embodiment, the placement of the first blowing opening portion 511, the second blowing opening portion 512, the first suction opening portion 541, and the second suction opening portion 551 in the seat air conditioner 5 according to the first embodiment is changed. However, the present disclosure is not limited to the above example. For example, in the seat air conditioner 5 according to the second embodiment, the third and fourth blowing opening portions 561 and 562 of the auxiliary blowing duct 56 may be opened on both sides of the seat 11 in the vehicle width direction, and the first and second blowing ducts 511 and 512 of the main blowing duct 51 may be opened in the center portion of the seat 11.

(Sixth Embodiment)

Next, a sixth embodiment will be described with reference to FIGS. 18 to 20. In the present embodiment, an example in which a first seat heater portion 61 and a second seat heater portion 62 are provided in both of a seat cushion portion 12 and a seat back portion 13 described in the first embodiment will be described.

Figure 18:
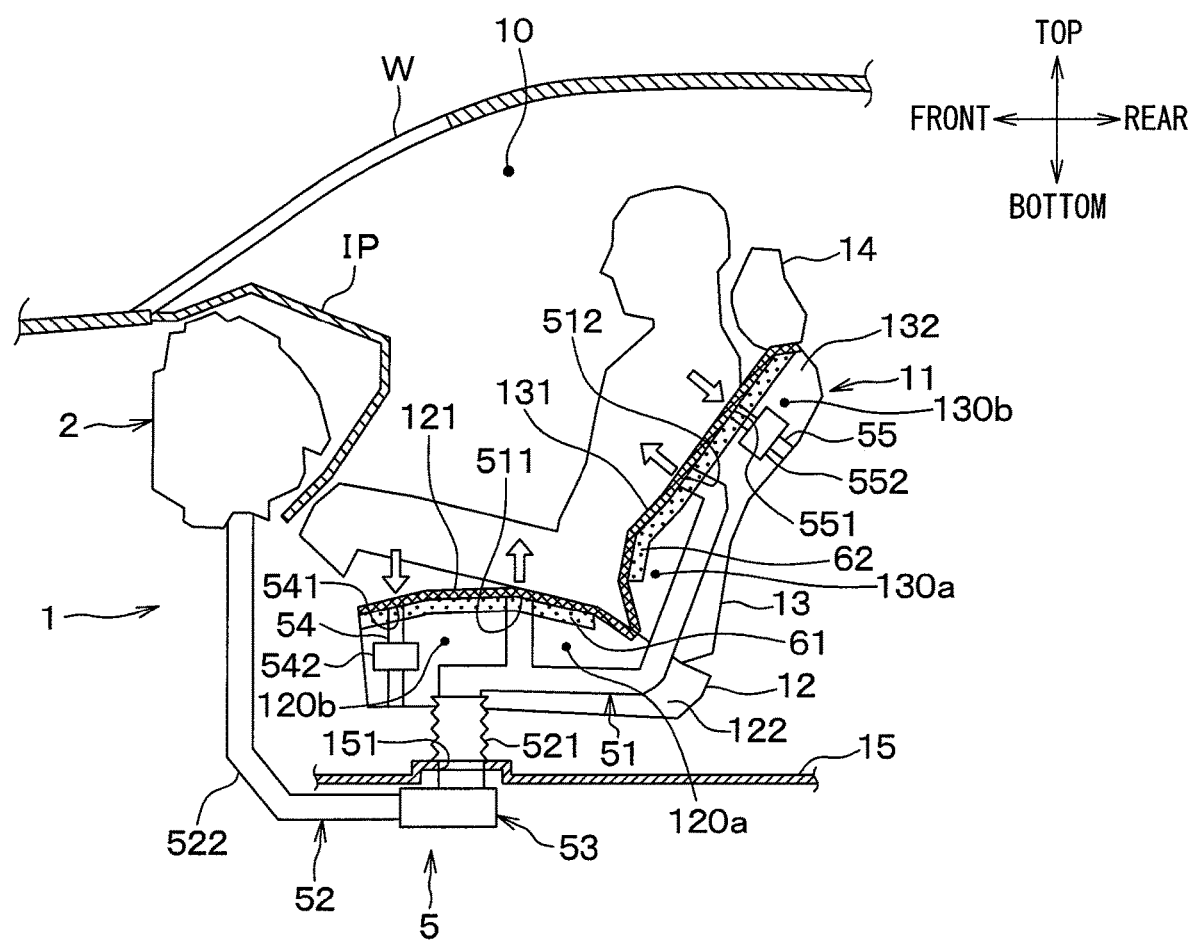
FIG. 18 is a schematic configuration diagram of an air conditioning device for a vehicle including a seat air conditioner according to a sixth embodiment.
Figure 19:
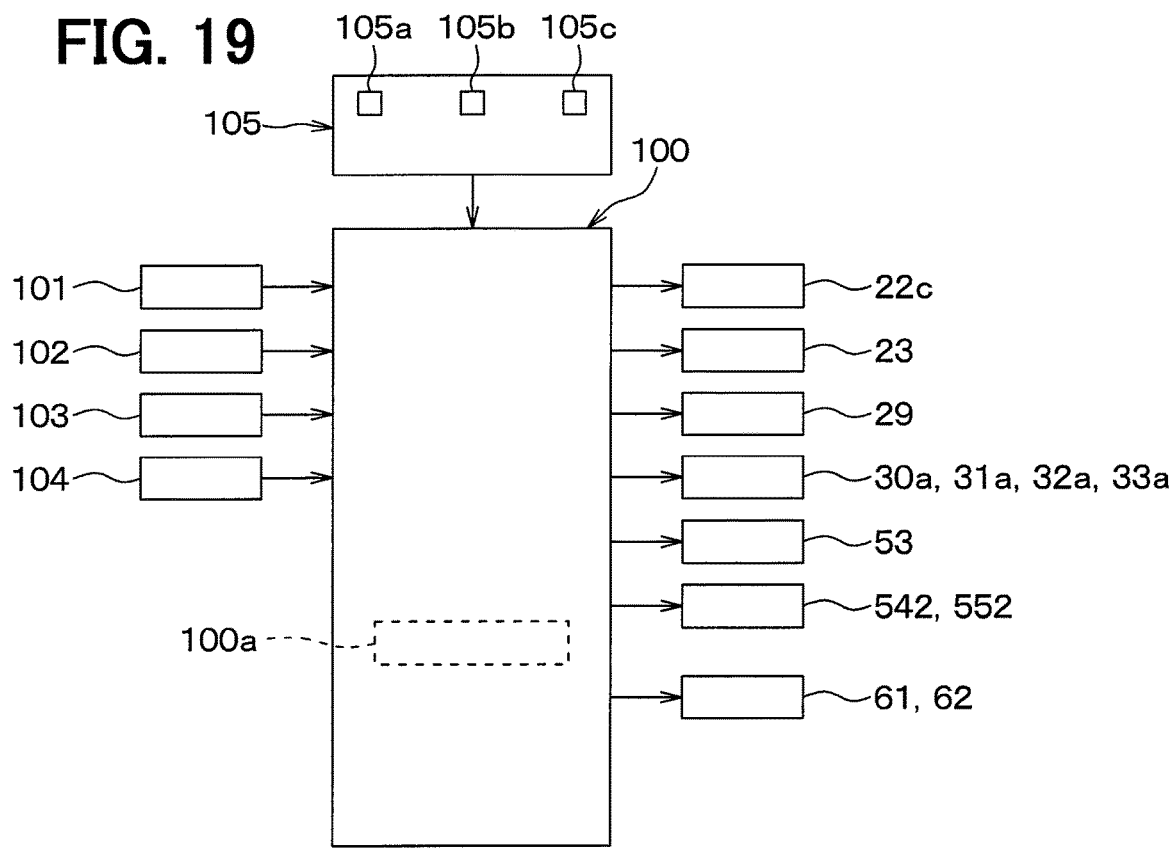
FIG. 19 is a block diagram of a control device according to the sixth embodiment.

As shown in FIG. 18, in the seat cushion portion 12 according to the present embodiment, the first seat heater portion 61 is provided between a skin member 121 and a pad member 122. The first seat heater portion 61 heats a lower body of the user, and is an electric heater that generates power by energization. A main blowing duct 51 and a first suction duct 54 are disposed so as to penetrate through the first seat heater portion 61 so that the interior of the main blowing duct 51 and the first suction duct 54 is not closed by the first seat heater portion 61.

Likewise, in the seat back portion 13 according to the present embodiment, the second seat heater portion 62 is provided between a skin member 131 and a pad member 132. The second seat heater portion 62 heats an upper body of the user, and is an electric heater that generates power by energization. The main blowing duct 51 and the second suction duct 55 are disposed so as to penetrate through the second seat heater portion 62 so that the interior of the main blowing duct 51 and the second suction duct 55 is not closed by the second seat heater portion 62.

The operation of the first seat heater portion 61 and the second seat heater portion 62 is controlled according to a control signal output from the control device 100. Specifically, as shown in FIG. 19, the first seat heater portion 61 and the second seat heater portion 62 are connected to an output side of the control device 100.

The seat air conditioner 5 according to the present embodiment is configured such that the control device 100 actuates the first seat heater portion 61 and the second seat heater portion 62 in an environment in which a temperature of an outside air is lower than a temperature of an inside air as in a winter season, to thereby provide immediate heating to the user.

Other configurations are the same as in the first embodiment. Hereinafter, a control process of the seat air conditioner 5 during heating to be executed by the control device 100 according to the present embodiment will be described with reference to FIG. 20. FIG. 20 shows a flow of processing to be executed by the control device 100 when both of the air conditioning operation switch 105a and the seat operation switch 105c are turned on in an environment where the temperature of the outside air falls below the temperature of the inside air.

Figure 20:
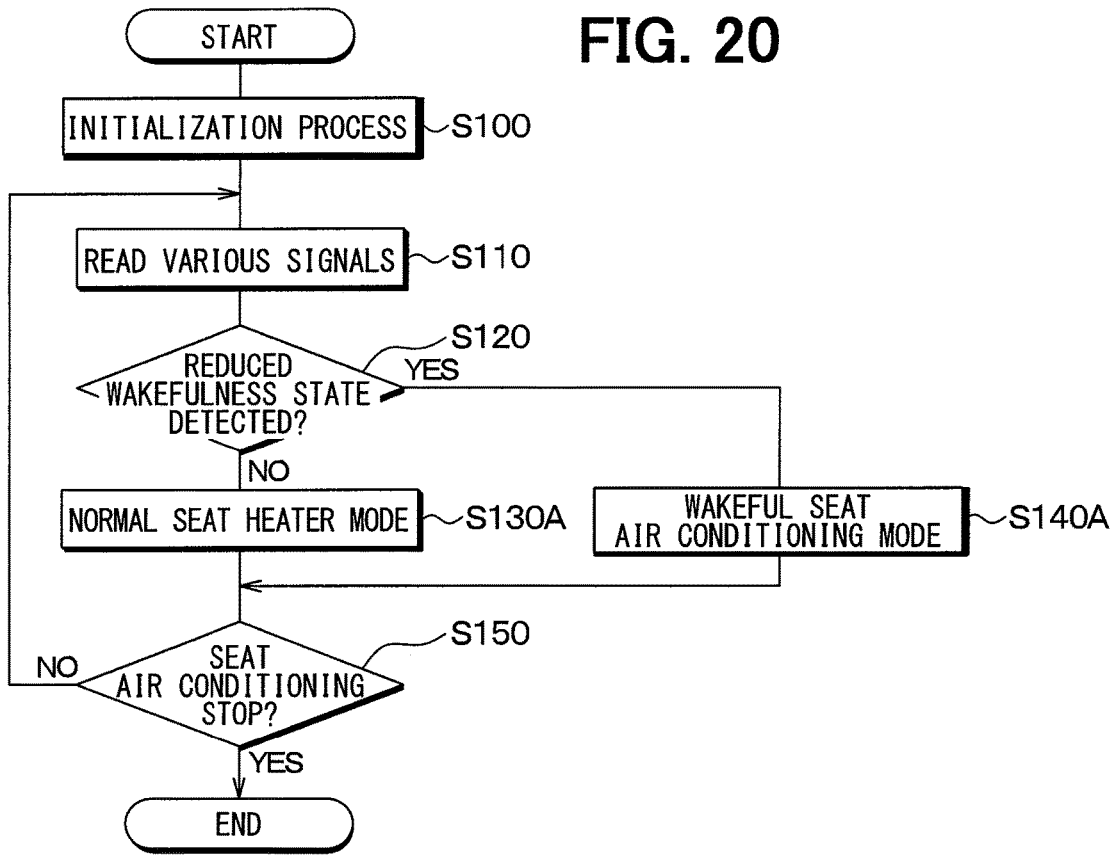
FIG. 20 is a flowchart showing a flow of a control process to be executed by a control device according to the sixth embodiment.

As shown in FIG. 20, the control device 100 executes an initialization process for initializing flags, timers, and so on in Step S100. The control device 100 reads various signals including detection signals of various sensor groups and operation signals of the operation panel 105, and so on in Step S110.

Subsequently, in Step S120, the control device 100 determines whether the user is in a reduced wakefulness state, or not. Specifically, in the determination process in Step S120, the reduced wakefulness detection unit 104 determines whether the reduced wakefulness state is detected, or not.

As a result of the determination process in Step S120, if it is determined that the user is not in the reduced wakefulness state, that is, if the reduced wakefulness state is not detected by the reduced wakefulness detection unit 104, the control device 100 executes the control process in a normal seat heater mode in Step S130A.

For example, in an environment under the winter extreme cold, cold is accumulated in the seat 11 having a large heat capacity. In that state, if the air is blown out from the front side of the seat 11, a cold air may be blown out to the occupant who is the user.

Therefore, in the normal seat heater mode, the control device 100 according to the present embodiment firstly energizes the respective seat heater portions 61 and 62, and after a predetermined time (for example, 1 minute to 5 minutes) has elapsed since energization has been started, the control device 100 executes the control process for starting the seat air conditioner 5.

In this way, in the normal seat heater mode, if the respective seat heater portions 61 and 62 are energized, the cold accumulated in the seat 11 can be removed. For that reason, the cold air, which are unpleasant for the user, can be prevented from being blown out when the air is blown from the front side of the seat 11.

On the other hand, as a result of the determination process in Step S120, if it is determined that the user is in the reduced wakefulness state, that is, if the reduced wakefulness state is detected by the reduced wakefulness detection unit 104, the control device 100 executes the control process in the wakeful seat air conditioning mode in Step S140A.

Specifically, the control device 100 energizes the seat heater portions 61 and 62 and actuates the first auxiliary blower 53. As a result, the air whose temperature has been adjusted by the interior air conditioning unit 2 is blown out from the front side of the seat 11 at the same time when the seat 11 is heated.

After the process in Step S130A or the process in Step S140A, the control device 100 determines whether to stop the seat air conditioner 5 and the respective seat heater portions 61, 62, or not, in Step S150.

When the control device 100 determines that the seat air conditioner 5 and the respective seat heater portions 61, 62 are to be stopped in the determination processing of Step S150, the control device 100 stops operating devices among the first auxiliary blower 53 and the respective seat heater portions 61, 62.

On the other hand, when the control device 100 determines that the seat air conditioner 5 and the respective seat heater portions 61, 62 are not to be stopped in the determination processing of Step S150, the control device 100 maintains the operation state of operating devices among the first auxiliary blower 53 and the respective seat heater portions 61, 62.

The processing to be executed by the control device 100 in an environment in which the temperature of the outside air is higher than the temperature of the inside air is the same as that in the first embodiment, and therefore a description of the processing will be omitted.

The seat air conditioner 5 according to the present embodiment described above basically has the same configuration as that of the first embodiment except for the addition of the respective seat heater portions 61 and 62. For that reason, the seat air conditioner 5 according to the present embodiment can obtain the same operational advantages as those in the first embodiment, which are obtained from the configuration common to the first embodiment.

In particular, when the wakefulness level of the user is reduced, the control device 100 according to the present embodiment executes a control process of blowing out the air whose temperature has been adjusted by the interior air conditioning unit 2 from the front side of the seat 11 through the main blowing duct 51 in a state where the respective seat heater portions 61 and 62 are energized. More specifically, when the wakefulness level of the user is reduced, the control device 100 according to the present embodiment executes the control process for implementing heating by each of the seat heater portions 61 an 62 and blowing of the air whose temperature has been adjusted by the interior air conditioning unit 2 from the main blowing duct 51 at the same time.

According to the above configuration, when the wakefulness level of the occupant is reduced, the air is blown out from the front side of the seat 11 through the main air flow duct 51 in addition to heating by each of the seat heater portions 61 and 62, thereby being capable of imparting the different heat sensations to the user. Imparting the different thermal sensations to the user provides the user with an opportunity to perceive the temperature change of the skin surface, and the wakefulness level of the occupant can be restored.

According to the present embodiment, in the normal seat heater mode, the control process for activating the seat air conditioner 5 is activated after the seat heater portions 61 and 62 have been energized, but the present disclosure is not limited to the above example.

The control device 100 may be configured to execute a control process of energizing each of the seat heater portions 61 and 62, for example, without activating the seat air conditioner 5 in the normal seat heater mode.

(Seventh Embodiment)

Next, a seventh embodiment will be described with reference to FIGS. 21 to 23. In the present embodiment, an example in which a first seat heater portion 61 and a second seat heater portion 62 are provided in both of a seat cushion portion 12 and a seat back portion 13 described in the second embodiment will be described.

Figure 21:
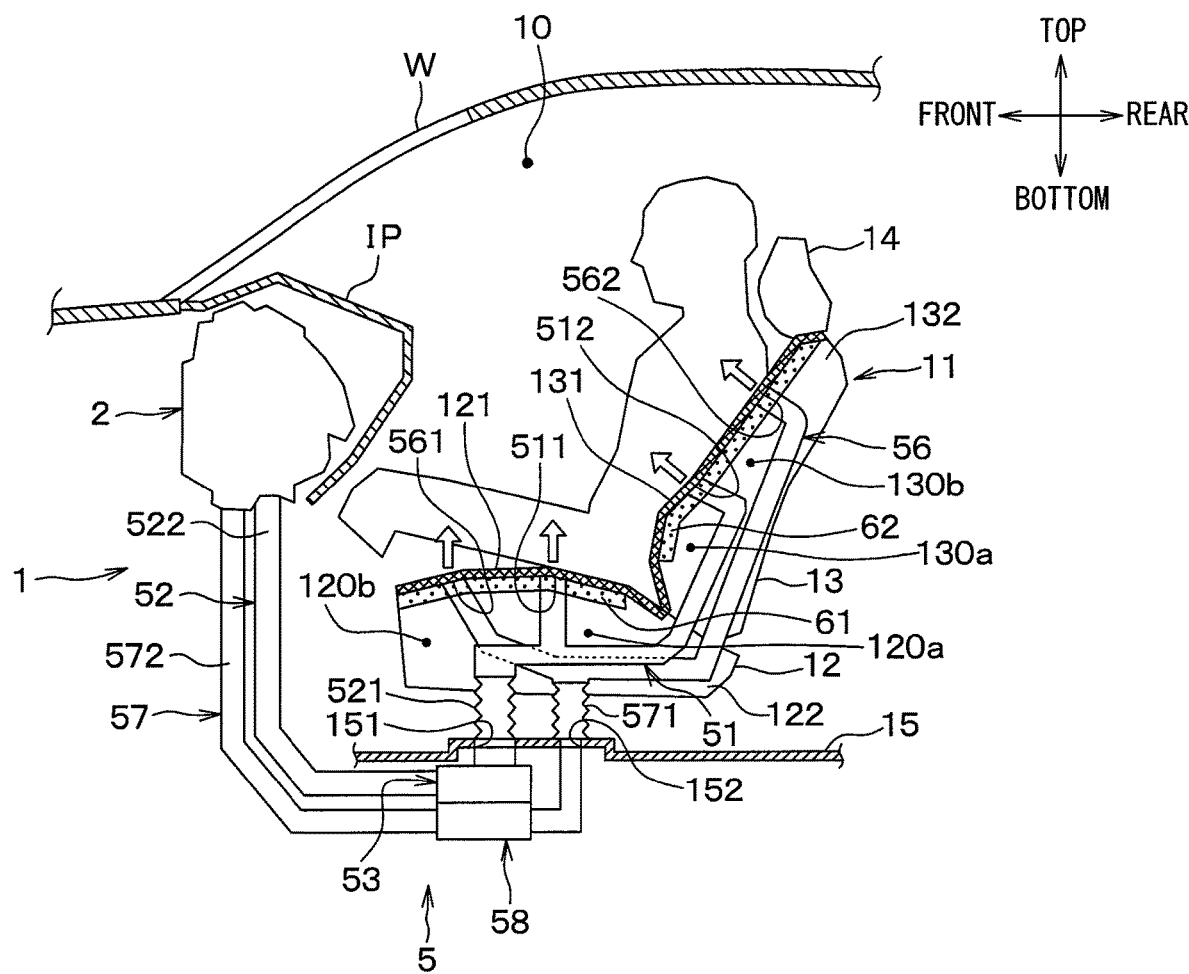
FIG. 21 is a schematic configuration diagram of an air conditioning device for a vehicle including a seat air conditioner according to a seventh embodiment.

As shown in FIG. 21, in the seat cushion portion 12 according to the present embodiment, the first seat heater portion 61 is provided between a skin member 121 and a pad member 122. Likewise, in the seat back portion 13 according to the present embodiment, the second seat heater portion 62 is provided between a skin member 131 and a pad member 132. A main blowing duct 51 and a first suction duct 56 are disposed so as to penetrate through the respective seat heater portions 61 and 62 so that the interior of the main blowing duct 51 and the auxiliary blowing duct 56 are not closed by the respective seat heater portions 61 and 62.

Figure 22:
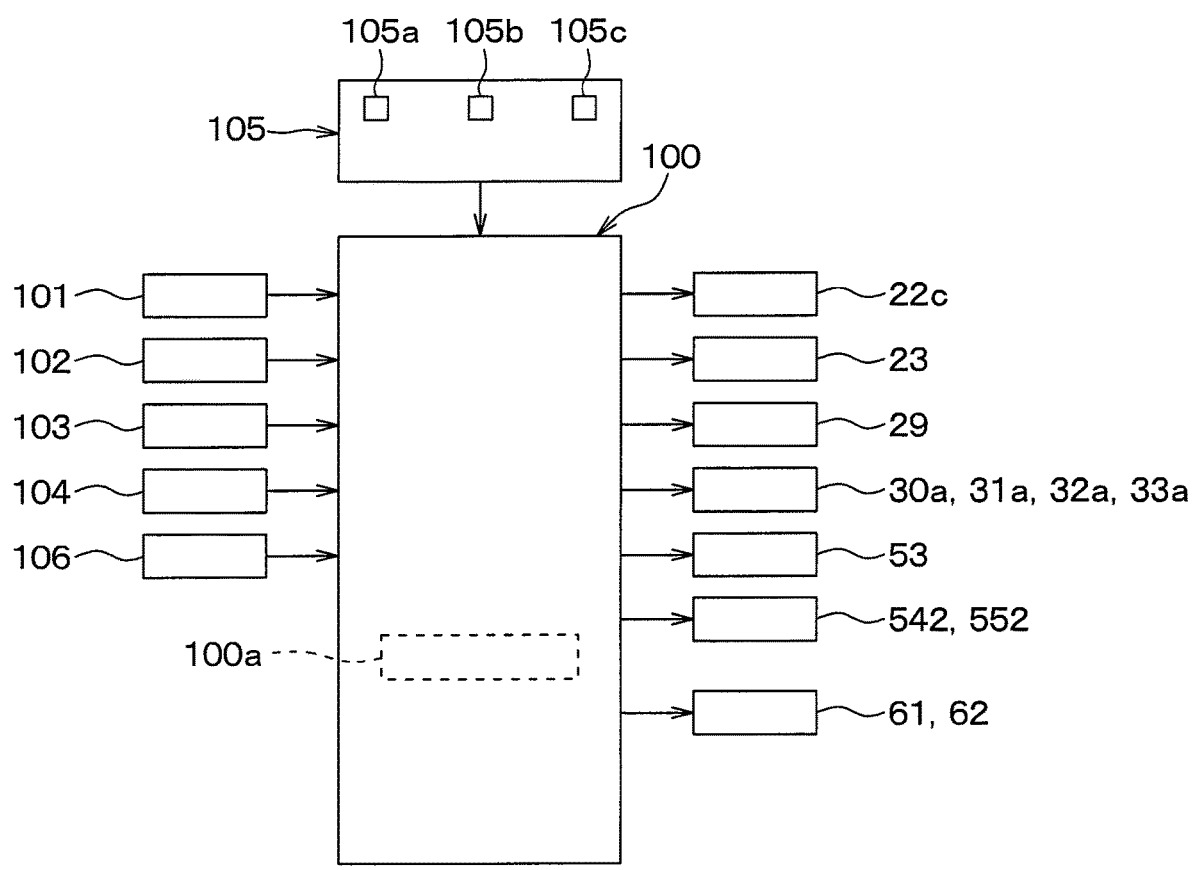
FIG. 22 is a block diagram of a control device according to the seventh embodiment.

As shown in FIG. 22, each of the seat heater portions 61 and 62 is connected to the output side of the control device 100, and the operation of the seat heater portions 61 and 62 is controlled according to the control signal output from the control device 100.

In addition, the control device 100 according to the present embodiment is connected with a heater core temperature sensor 106. In order to ascertain a heating capacity of the interior air conditioning unit 2, the heater core temperature sensor 106 detects the temperature of the heater core 28. The heater core temperature sensor 106 may be, for example, a temperature sensor for detecting a temperature of a coolant water flowing into the heater core 28 or a temperature sensor for directly detecting the temperature of the heater core 28.

The other configurations are the same as in the first and second embodiments. Hereinafter, a control process of the seat air conditioner 5 during heating to be executed by the control device 100 according to the present embodiment will be described with reference to FIG. 23. FIG. 23 shows a flow of processing to be executed by the control device 100 when both of the air conditioning operation switch 105a and the seat operation switch 105c are turned on in an environment where the temperature of the outside air falls below the temperature of the inside air.

Figure 23:
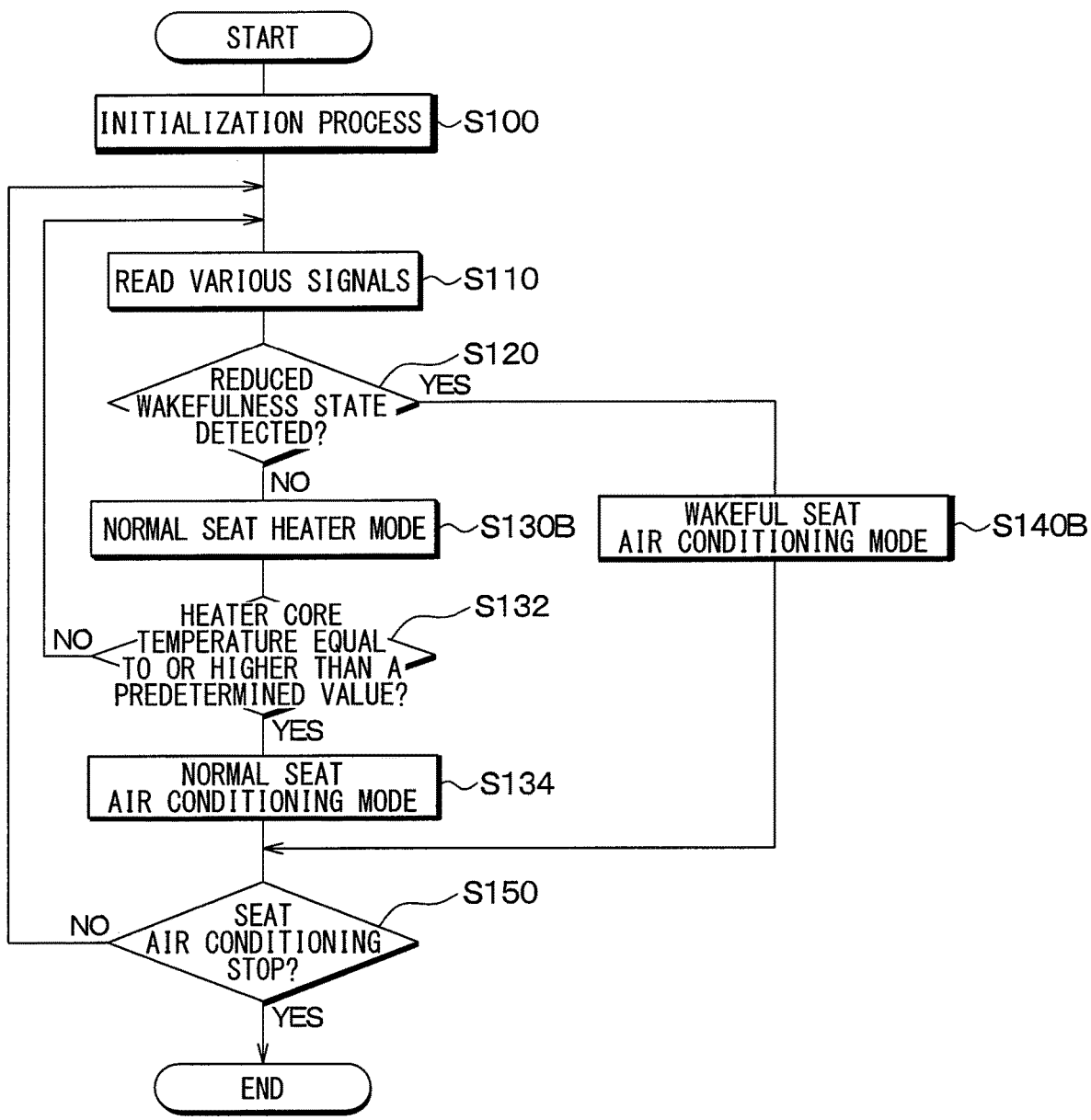
FIG. 23 is a flowchart showing a flow of a control process to be executed by a control device according to the seventh embodiment.

As shown in FIG. 23, the control device 100 executes an initialization process for initializing flags, timers, and so on in Step S100. The control device 100 reads various signals including detection signals of various sensor groups and operation signals of the operation panel 105, and so on in Step S110.

Subsequently, in Step S120, the control device 100 determines whether the user is in a reduced wakefulness state, or not. Specifically, in the determination process in Step S120, the reduced wakefulness detection unit 104 determines whether the reduced wakefulness state is detected, or not.

As a result of the determination process in Step S120, if it is determined that the user is not in the reduced wakefulness state, that is, if the reduced wakefulness state is not detected by the reduced wakefulness detection unit 104, the control device 100 executes the control process in a normal seat heater mode in Step S130B.

For example, in an extremely cold environment in winter, the temperature of the coolant water flowing into the heater core 28 may be extremely low. In that state, if the air is blown out from the front side of the seat 11, a cold air may be blown out to the occupant who is the user.

Therefore, in the normal seat heater mode, the control device 100 according to the present embodiment energizes the seat heater portions 61 and 62 in a state where the seat air conditioner 5 is stopped. In this way, in the normal seat heater mode, if the respective seat heater portions 61 and 62 are energized, the cold air which is unpleasant for the user can be prevented from being blown out from the front side of the seat 11.

Subsequently, in Step S132, the control device 100 determines whether the heater core temperature detected by the heater core temperature sensor 106 is equal to or higher than a predetermined value, or not. The predetermined value is a value equal to or higher than at least a temperature of the inside air. For example, the predetermined value is set to a set temperature Tset set by the setting switch 105b.

When it is determined that the heater core temperature is equal to or higher than the predetermined value as a result of the determination processing in Step S132, the control device 100 executes the control process of the normal seat air conditioning mode in Step S134.

In the normal seat air conditioning mode, the control device 100 according to the present embodiment activates the seat air conditioner 5 in a state where the seat heater portions 61 and 62 are energized. More specifically, the control device 100 actuates the first auxiliary blower 53 provided in the main duct member 52 in a state where the second auxiliary blower 58 provided in the auxiliary duct member 57 is stopped.

On the other hand, as a result of the determination process in Step S120, if it is determined that the user is in the reduced wakefulness state, that is, if the reduced wakeful-ness state is detected by the reduced wakefulness detection unit 104, the control device 100 executes the control process in the wakeful seat air conditioning mode in Step S140B.

Specifically, the control device 100 energizes each of the seat heater portions 61 and 62 and also actuates both of the first auxiliary blower 53 provided in the main duct member 52 and the second auxiliary blower 58 provided in the auxiliary duct member 57. As a result, at the same time when the seat 11 warms up, the air whose temperature has been adjusted by the interior air conditioning unit 2 and the cold air which has passed through the evaporator 24 of the interior air conditioning unit 2 are blown out from the front side of the seat 11.

After the process in Step S134 or the process in Step S140B, the control device 100 determines whether to stop the seat air conditioner 5 and the respective seat heater portions 61, 62, or not, in Step S150.

When the control device 100 determines that the seat air conditioner 5 and the respective seat heater portions 61, 62 are to be stopped in the determination processing of Step S150, the control device 100 stops operating devices among the respective auxiliary blowers 53, 58 and the respective seat heater portions 61, 62.

On the other hand, when the control device 100 determines that the seat air conditioner 5 and the respective seat heater portions 61, 62 are not to be stopped in the determination processing of Step S150, the control device 100 maintains the operation state of operating devices among the respective auxiliary blowers 53, 58 and the respective seat heater portions 61, 62.

The processing to be executed by the control device 100 in an environment in which the temperature of the outside air is higher than the temperature of the inside air is the same as that in the second embodiment, and therefore a description of the processing will be omitted.

The seat air conditioner 5 according to the present embodiment described above basically has the same configuration as that of the second embodiment except for the addition of the respective seat heater portions 61 and 62. For that reason, the seat air conditioner 5 according to the present embodiment can obtain the same operational advantages as those in the second embodiment, which are obtained from the configuration common to the second embodiment.

In particular, when the wakefulness level of the user is reduced, the control device 100 according to the present embodiment executes a control process of blowing out the air whose temperature has been adjusted by the interior air conditioning unit 2 and the cold air that has passed through the evaporator 24 from the front side of the seat 11 in a state where the respective seat heater portions 61 and 62 are energized.

According to the above configuration, when the wakefulness level of the occupant is reduced, the cold air having passed through the evaporator 24 is blown out in addition to heating by blowing of the air from the seat heater portions 61, 62 and the interior air conditioning unit 2, thereby being capable of imparting the different thermal sensations to the user. Imparting the different thermal sensations to the user provides the user with an opportunity to perceive the temperature change of the skin surface, and the wakefulness level of the occupant can be restored.

(Eighth Embodiment)

Next, an eighth embodiment will be described with reference to FIG. 24.

In the present embodiment, an example in which the air whose temperature has been adjusted by a temperature adjustment unit 7 independent from an interior air conditioning unit 2 is supplied to a seat air conditioner 5 will be described.

Figure 24:
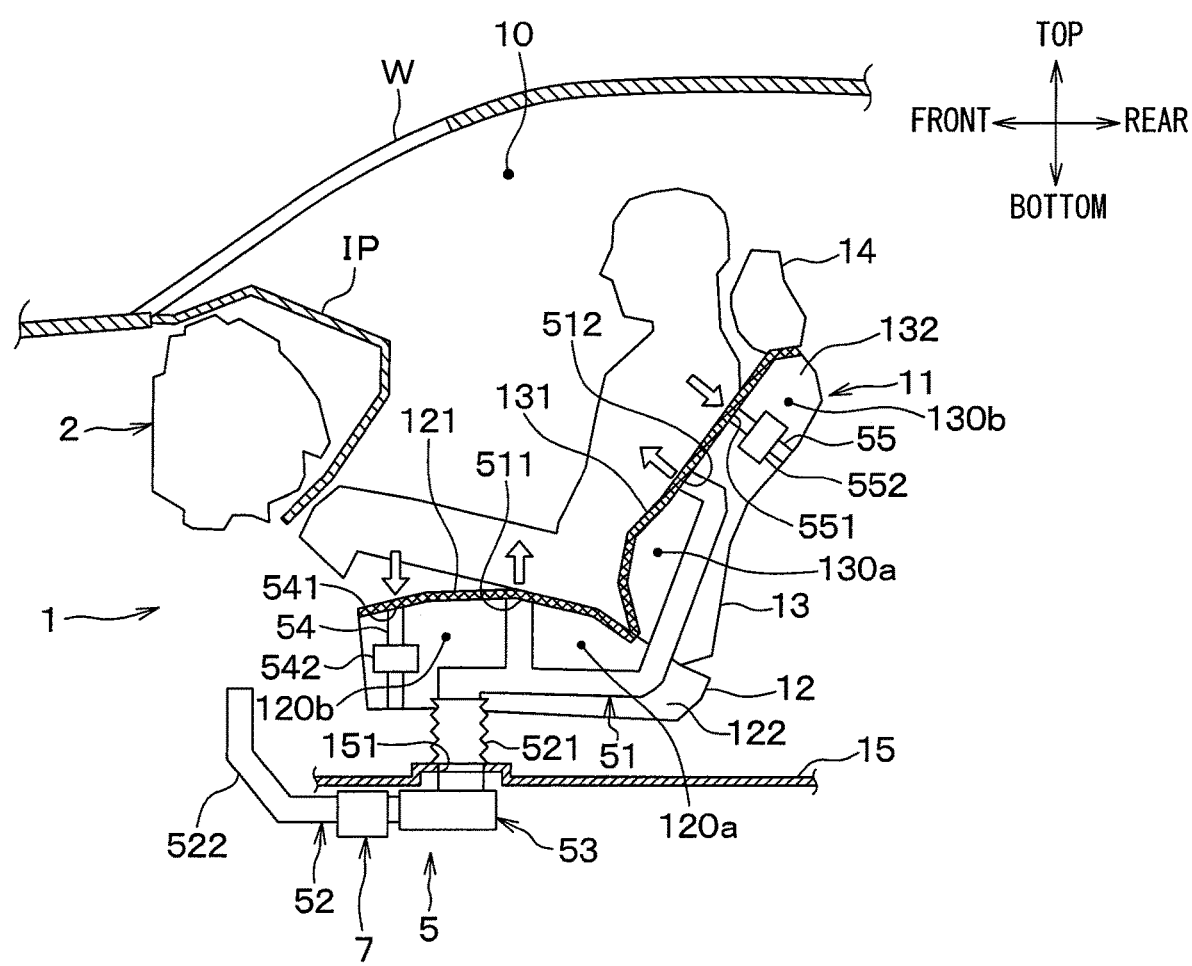
FIG. 24 is a schematic configuration diagram of an air conditioning device for a vehicle including a seat air conditioner according to an eighth embodiment.

As illustrated in FIG. 24, an air conditioning device for a vehicle 1 includes the temperature adjustment unit 7 independent from the interior air conditioning unit 2. The temperature adjustment unit 7 is a temperature controller using a heat pump, a Peltier element, or the like capable of generating heat and cold, for example.

The temperature adjustment unit 7 according to the present embodiment is disposed below a floor surface 15 and inside an instrument panel IP so as not to affect a design property of the vehicle interior space 10. The temperature adjustment unit 7 may be disposed inside the seat 11 or on the back side of the seat back portion 13.

The main blowing duct 51 according to the present embodiment is connected to the temperature adjustment unit 7 through the main duct member 52 so that the air whose temperature has been adjusted by the temperature adjustment unit 7 flows through the main blowing duct 51. The main duct member 52 according to the present embodiment is open so that one end side of the main duct member 52 is connected to the main blowing duct 51 and the other end side of the main duct member 52 communicates with the vehicle interior space 10.

Other configurations are the same as in the first embodiment. The seat air conditioner 5 according to the present embodiment can obtain the same operational advantages as those in the first embodiment, which are obtained from the configuration common to the first embodiment.

In particular, in the present embodiment, since the air whose temperature has been adjusted by the temperature adjustment unit 7 independent from the interior air conditioning unit 2 can be blown to the user, even when the seat air conditioner 5 is activated, a temperature adjustment function of the vehicle interior space 10 by the interior air conditioning unit 2 can be maintained.

(Other Embodiments)

The typical embodiments disclosed in the present disclosure have been described above. However, the present disclosure is not limited to the embodiments described above, but can be variously modified.

It is desirable to provide the multiple air flow ducts independent from each other for both of the seat cushion portion 12 and the seat back portion 13 as in the above embodiments, but the present disclosure is not limited to the above configuration.

For example, the multiple air flow ducts independent of each other may be provided for the seat cushion portion 12 of the seat cushion portion 12 and the seat back portion 13. In that case, the different thermal sensations can be imparted to the lower body of the user who is liable to be wetted when the user comes into contact with the seat 11.

In addition, the multiple air flow ducts independent of each other may be provided for the seat back portion 13 of the seat cushion portion 12 and the seat back portion 13. In that case, different thermal sensations can be imparted to the upper body of the user who is sensitive to a temperature change.

Further, in the respective embodiments described above, the example has been described in which the opening portions that open at one end side of the multiple air flow ducts are placed at different positions in consideration of the degree of pressure applied by the user's body, but the present disclosure is not limited to the above configuration.

The opening portions that open on one end side of the multiple air flow ducts may be alternately arranged, for example. According to that configuration, since temperature unevenness easily occurs in the seat 11, the different thermal sensations can be imparted to the user.

Further, in each of the embodiments described above, the example in which the auxiliary blower is disposed for the duct member such as the main duct member 52 or the auxiliary duct member 57 has been described, but the present disclosure is not limited to the above configuration. For example, the auxiliary blower may be disposed for the air flow duct.

Further, according to the respective embodiments described above, the example in which the air conditioning mode is switched from the normal seat air conditioning mode to the wakeful seat air conditioning mode when the reduced wakefulness state is detected by the reduced wakefulness detection unit 104 has been described, but the present disclosure is not limited to the above configuration.

The seat air conditioner 5 may be configured so as to switch from the normal seat air conditioning mode to the wakeful seat air conditioning mode, for example, when a predetermined time (for example, 20 minutes to 60 minutes) has elapsed since the start of the seat air conditioner 5. Further, the seat air conditioner 5 may be configured to execute the wakeful seat air conditioning mode as well as to change a mood of the user when a continuous operation state of the vehicle continues for a predetermined time (for example, 20 minutes to 60 minutes).

In the respective embodiments described above, elements forming the embodiments are not necessarily indispensable as a matter of course, except when the elements are particularly specified as indispensable and the elements are considered as obviously indispensable in principle.

In the respective embodiments described above, when numerical values such as the number, figures, quantity, a range of constituent elements in the embodiments are described, the numerical values are not limited to a specific number, except when the elements are particularly specified as indispensable and the numerical values are obviously limited to the specific number in principle.

In the respective embodiments described above, when a shape, and a positional relationship of the constituent elements are described, the constituent elements are not limited to the shape, and the positional relationship, except when the constituent elements are particularly specified and are limited to a specific shape, and positional relationship in principle.

CONCLUSION

According to a first aspect of a part or all of the embodiments described above, the seat air conditioner includes multiple air flow ducts that are provided in at least one of the seat back portion or the seat cushion portion and that define an air flow passage for the air to be blown out from the seat or the air to be drawn into the seat. Some of the multiple air flow ducts are configured to be independent from the other air flow ducts different from the some air flow ducts such that air, which is different in temperature from the air flowing through the other air flow ducts, is allowed to flow through the some air flow ducts.

According to a second aspect, some of the air flow ducts in the seat air conditioner are configured such that the air blown out from the seat flows through the some air flow ducts, and are connected to a temperature adjustment unit that adjusts the temperature of the air blown out from the seat to a temperature different from a temperature of the vehicle interior air.

As described above, with the configuration in which the air adjusted to a temperature different from the temperature of the vehicle interior air by the temperature adjustment unit is blown out from the seat through some of the air flow ducts, the thermal sensation different from that in the vehicle interior space can be imparted to the user.

According to a third aspect, in the seat air conditioner, the temperature adjustment unit is an air conditioning unit that conditions the air in the vehicle interior space. According to the above configuration, since the air adjusted to a comfortable temperature for the user can be blown out, comfort of the user can be secured. In addition, as compared with a configuration in which a dedicated device for adjusting the temperature of the air flowing through some of the air flow ducts is added, if the temperature adjustment unit is configured with the air conditioning unit for conditioning the air in the vehicle interior space, the seat air conditioner can be simplified.

According to a fourth aspect, the other air flow ducts of the seat air conditioner include a suction duct, and the air drawn into the seat from the front side of the seat forming the contact surface of the user flows through the suction duct.

According to the above configuration, the seat air conditioner can blow out the air whose temperature has been adjusted by the temperature adjustment unit through some of the air flow ducts from the surface side of the seat, while blowing the air from the front surface of the seat through the suction duct included in the other air flow ducts. With the configuration in which both of the air blowing and the air drawing are performed at the same time in at least one of the seat back portion or the seat cushion portion, different heat sensations can be imparted to the user with a great change in a wind direction in the vicinity of the seat. This is also effective in preventing user's drowsiness.

According to a fifth aspect, in the seat air conditioner, a blowing portion communicating with one air flow duct is provided at a high seat pressure portion supporting the user's buttocks and waist on the front side forming the contact surface with the user in the seat in a seated state in which the user is seated on the seat. In addition, a suction portion communicating with the suction duct is provided in a portion different from the high seat pressure portion.

According to the above configuration, since the air having a temperature difference from the vehicle interior air can be supplied from the high seat pressure portion of the seat which supports the buttocks and waist of the user, a sufficient thermal sensation can be imparted to the user. Further, in the structure in which the air is drawn from portions other than the high seat pressure portion, since a sufficient suction amount of air can be secured, the different heat sensations can be easily imparted to the user.

According to a sixth aspect, in the seat air conditioner, the blowing portion and the suction portion are provided on at least the front side forming the contact surface with the user in the seat back portion. The blowing portion is provided below the seat back portion more than the suction portion.

The waist of the user is supported at the lower portion of the seat back portion. For that reason, the blowing portion is provided on the lower side of the suction portion in the seat back portion, thereby being capable of imparting a sufficient thermal sensation to the user while reducing the wetting of the upper body of the user.

According to a seventh aspect, in the seat air conditioner, the blowing portion and the suction portion are provided on at least the front side forming the contact surface with the user in the seat cushion portion. The blowing portion is provided on a front side of the seat back portion more than the suction portion.

The waist of the user is supported at the rear portion of the seat cushion portion. For that reason, the blowing portion is provided on the rear side of the suction portion in the seat back portion, thereby being capable of imparting a sufficient thermal sensation to the user while reducing the wetting of the lower body of the user.

According to an eighth aspect, the other air flow ducts of the seat air conditioner includes a blowing duct through which the air blown from the seat flows. The blowing duct communicates with the vehicle interior space so that the vehicle interior air flows through the blowing duct.

According to the above configuration, the seat air conditioner can blow out the air whose temperature has been adjusted by the temperature adjustment unit through some of the air flow ducts, while blowing the vehicle interior air through the blowing duct included in the other air flow ducts. In a configuration capable of blowing out air at different temperatures at the same time from at least one of the seat back portion and the seat cushion portion, since the different thermal sensations can be easily imparted to the user, the above configuration is preferable for prevention of drowsiness of the user and partial temperature adjustment in the seat.

According to a ninth aspect, the other air flow ducts of the seat air conditioner includes a blowing duct through which the air blown from the seat flows. The blowing duct is connected to the temperature adjustment so that the air whose temperature has been adjusted by the temperature adjustment unit flows through the blowing duct. Some air flow ducts and the blowing duct are separately connected to the temperature adjustment unit so that air at different temperatures can flow through the some air flow ducts and the blowing duct.

According to the above configuration, air at different temperatures can be blown out from the front side of the seat through the blowing ducts included in some air flow ducts and the other air flow ducts at the same time. In particular, in the configuration described above, since the different thermal sensations can be easily imparted to the user, the above configuration is preferable for prevention of drowsiness of the user and partial temperature adjustment in the seat.

According to a tenth aspect, in the seat air conditioner, a first blowing portion communicating with one air flow duct is provided at a high seat pressure portion supporting the user's buttocks and waist on the front side forming the contact surface with the user in the seat in a seated state in which the user is seated on the seat. A second blowing portion communicating with the blowing duct is provided in a portion different from the high seat pressure portion.

According to the above configuration, since the air having a temperature difference from the vehicle interior air can be supplied from the high seat pressure portion of the seat which supports the buttocks and waist of the user, a sufficient thermal sensation can be imparted to the user. Further, air at different temperatures is blown out from the portions other than the high seat pressure portion in the seat so that the different thermal sensations can be imparted to the user while sufficiently securing the amount of air blown out in the entire seat.

According to an eleventh aspect, in the seat air conditioner, the first blowing portion and the second blowing portion are provided on at least the front side forming the contact surface with the user in the seat back portion. The first blowing portion is provided below the seat back portion more than the second blowing portion.

As described above, the first blowing portion is provided on the lower side of the second suction portion in the seat back portion, thereby being capable of imparting a sufficient thermal sensation to the user while reducing the wetting of the upper body of the user.

According to a twelfth aspect, in the seat air conditioner, the first blowing portion and the second blowing portion are provided on at least the front side forming the contact surface with the user in the seat cushion portion. The first blowing portion is provided on the front side of the seat back portion more than the second blowing portion.

As described above, the first blowing portion is provided on the rear side of the second suction portion in the seat cushion portion, thereby being capable of imparting a sufficient thermal sensation to the user while reducing the wetting of the lower body of the user.

According to a thirteenth aspect, the seat air conditioner includes a temperature adjustment control unit that controls the temperature adjustment unit. In a reduced wakefulness state where the wakefulness level of the user is reduced, the temperature adjustment control unit controls the temperature adjustment unit such that the temperature of the air flowing through some of the air flow ducts is set to be different from that of the air flowing through the other air flow ducts.

As described above, when the wakefulness level of the occupant is reduced, air at a different temperature from the air flowing through the other air flow ducts is blown out from the front side of the seat through some air flow ducts among the multiple air flow ducts, thereby being capable of imparting the different thermal sensation to the user. Imparting the different thermal sensations to the user provides the user with an opportunity to perceive the temperature change of the skin surface, and the wakefulness level of the user can be restored.

According to a fourteenth aspect, in the seat air conditioner, the multiple air flow ducts is configured independently of each other so that the air flowing inside the air flow ducts is not mixed with each other. According to the above configuration, since the air flowing inside the multiple air flow ducts is not mixed with each other, air at different temperatures, air volumes, and the like is allowed to flow through the multiple air flow ducts, thereby being capable of sufficiently imparting different thermal sensations to the user.

What is claimed is:

1. A seat air conditioner for use in a seat disposed in a vehicle interior space, the seat including a seat back portion which supports an upper body side of a user and a seat cushion portion which supports a lower body side of the user, the seat air conditioner comprising:
   a plurality of air flow ducts provided in at least one of the seat back portion or the seat cushion portion, the plurality of air flow ducts defining an air flow passage for air to be blown out from the seat or air to be drawn into the seat, wherein
   one air flow duct of the plurality of air flow ducts is configured to be independent from other air flow ducts other than the one air flow duct, such that air, which is different in temperature from air flowing through the other air flow ducts, is allowed to flow through the one air flow duct, and
   the one air flow duct is configured such that air blown out from the seat flows through the one air flow duct, and is connected to a temperature adjustment unit that adjusts a temperature of the air blown out from the seat to a temperature different from a temperature of vehicle interior air.

2. The seat air conditioner according to claim 1, wherein the temperature adjustment unit includes an air conditioning unit that air conditions the vehicle interior space.

3. The seat air conditioner according to claim 1, wherein the other air flow ducts include a suction duct, the air drawn into the seat from a front side of the seat that forms a contact surface with the user flowing through the suction duct.

4. The seat air conditioner according to claim 3, wherein on the front side of the seat which forms the contact surface with the user, in a seated state in which the user is seated on the seat, a blowing portion in communication with the one air flow duct is provided at a high seat pressure portion that supports a buttocks and a waist of the user, and a suction portion in communication with the suction duct is provided at a portion different from the high seat pressure portion.

5. The seat air conditioner according to claim 4, wherein the blowing portion and the suction portion are provided on at least a front side of the seat back portion which forms a contact surface with the user, and
the blowing portion is provided on a lower side of the seat back portion than the suction portion.

6. The seat air conditioner according to claim 4, wherein the blowing portion and the suction portion are provided on at least a front side of the seat cushion portion which forms a contact surface with the user, and
the blowing portion is provided on a front side of the seat back portion more than the suction portion.

7. The seat air conditioner according to claim 1, wherein the other air flow ducts include a blowing duct through which the air blown from the seat flows, and
the blowing duct is in communication with the vehicle interior space such that the vehicle interior air flows through the blowing duct.

8. The seat air conditioner according to claim 7, wherein on the front side of the seat which forms the contact surface with the user, in a seated state in which the user is seated on the seat, a first blowing portion in communication with the one air flow duct is provided at a high seat pressure portion that supports a buttocks and a waist of the user, and a second blowing portion in communication with the blowing duct is provided at a portion different from the high seat pressure portion.

9. The seat air conditioner according to claim 8, wherein the first blowing portion and the second blowing portion are provided on at least a front side of the seat back portion which forms a contact surface with the user, and
the first blowing portion is provided on a lower side of the seat back portion than the second blowing portion.

10. The seat air conditioner according to claim 8, wherein the first blowing portion and the second blowing portion are provided on at least a front side of the seat cushion portion which forms a contact surface with the user, and
the first blowing portion is provided on a front side of the seat back portion more than the second blowing portion.

11. The seat air conditioner according to claim 1, wherein the other air flow ducts include a blowing duct through which the air blown from the seat flows,
the blowing duct is connected to the temperature adjustment unit such that the air flowing through the blowing duct has a temperature which has been adjusted by the temperature adjustment unit, and
the one air flow duct and the blowing duct are separately connected to the temperature adjustment unit to allow air at different temperatures to flow through the one air flow duct and the blowing duct.

12. The seat air conditioner according to claim 1, further comprising:
a temperature adjustment control unit that controls the temperature adjustment unit, wherein
the temperature adjustment control unit controls the temperature adjustment unit such that the air flowing through the one air flow duct is at a different temperature from the air flowing through the other ducts when the user is in a reduced wakefulness state where a wakefulness level of the user is reduced.

13. The seat air conditioner according to claim 1, wherein the plurality of air flow ducts are configured to be independent from each other such that the air flowing inside each of the air flow ducts does not mix with each other.

* * * * *